(12) United States Patent
Habu et al.

(10) Patent No.: US 9,508,030 B2
(45) Date of Patent: Nov. 29, 2016

(54) INFORMATION PROCESSING APPARATUS WITH IMAGE GENERATING UNIT GENERATING GLOSS-CONTROL PLANE DATA AND DESIGNATING EMPHASIS TO AN IMAGE REGION FOR GLOSSINESS CONTROL TO CHANGE SURFACE EFFECT OF RECORDING MEDIUM

(71) Applicants: Yuichi Habu, Ibaraki (JP); Hiroo Kitagawa, Kanagawa (JP)

(72) Inventors: Yuichi Habu, Ibaraki (JP); Hiroo Kitagawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 13/860,151

(22) Filed: Apr. 10, 2013

(65) Prior Publication Data
US 2013/0271778 A1 Oct. 17, 2013

(30) Foreign Application Priority Data

Apr. 11, 2012 (JP) .................................. 2012-090584

(51) Int. Cl.
| | | |
|---|---|---|
| G06F 15/00 | (2006.01) |
| G06K 15/02 | (2006.01) |
| G06F 3/12 | (2006.01) |
| H04N 1/23 | (2006.01) |

(52) U.S. Cl.
CPC ............. G06K 15/02 (2013.01); G06F 3/1208 (2013.01); G06F 3/1254 (2013.01); G06F 3/1282 (2013.01); H04N 1/233 (2013.01)

(58) Field of Classification Search
None
See application file for complete search history.

(56) References Cited

U.S. PATENT DOCUMENTS

| | | | | |
|---|---|---|---|---|
| 7,656,556 B2 * | 2/2010 | Wang | .............................. | 358/2.1 |
| 8,391,733 B2 * | 3/2013 | Shiozawa | ........................ | 399/45 |
| 8,588,633 B2 * | 11/2013 | Takemura | ........................ | 399/46 |
| 8,649,696 B2 * | 2/2014 | Takemura | ........................ | 399/67 |
| 8,655,252 B2 * | 2/2014 | Chiyoda | ........................ | 399/341 |
| 2009/0034998 A1 | 2/2009 | Omata | | |
| 2011/0273732 A1 * | 11/2011 | Kojima et al. | ................. | 358/1.9 |
| 2012/0062956 A1 | 3/2012 | Kitagawa et al. | | |
| 2012/0063802 A1 | 3/2012 | Suzuki et al. | | |
| 2012/0237244 A1 * | 9/2012 | Yoshikawa et al. | ............ | 399/67 |

FOREIGN PATENT DOCUMENTS

| | | |
|---|---|---|
| JP | 3473588 | 9/2003 |
| JP | 2007-034040 | 2/2007 |
| JP | 2009-058941 | 3/2009 |
| JP | 2010-152129 | 7/2010 |
| JP | 2012-83736 A | 4/2012 |

* cited by examiner

Primary Examiner — Helen Q Zong
(74) Attorney, Agent, or Firm — Oblon, McClelland, Maier & Neustadt, L.L.P.

(57) ABSTRACT

An information processing apparatus includes: an image data generation unit that generates image data of a gloss control plane including a type of a surface effect given to at least a region of a recording medium, coordinates to identify the region, and designation to emphasize, among a first region and a second region adjacent to each other, a surface effect of the first region as compared with a surface effect of the second region; a change unit that changes the surface effect of the second region when the designation to emphasis is given to the first region; a print data generation unit that generates print data on the basis of the image data of the gloss control plane in which the surface effect of the second region has been changed by the change unit; and an output unit that outputs the print data.

6 Claims, 27 Drawing Sheets

| GLOSS CONTROL NAME | GLOSS | DEVIATION |
|---|---|---|
| PREMIUM GLOSS (PG) | Gs≥80 | ΔGs≤10 |
| GLOSS (G) | Gs=Gs (GLOSS) | ΔGs≤10 |
| MATT (M) | Gs=Gs (1C30% HALFTONE DOTS) | ΔGs≤10 |
| PREMIUM MATT (PM) | Gs≤10 | ΔGs≤10 |

IMAGE DATA OF GLOSS CONTROL PLANE

▨ : REGION WHERE PG IS DESIGNATED (DENSITY VALUE 98%)

▧ : REGION WHERE G IS DESIGNATED (DENSITY VALUE 90%)

☰ : REGION WHERE M IS DESIGNATED (DENSITY VALUE 16%)

IMAGE DATA OF CLEAR PLANE

FIG.8

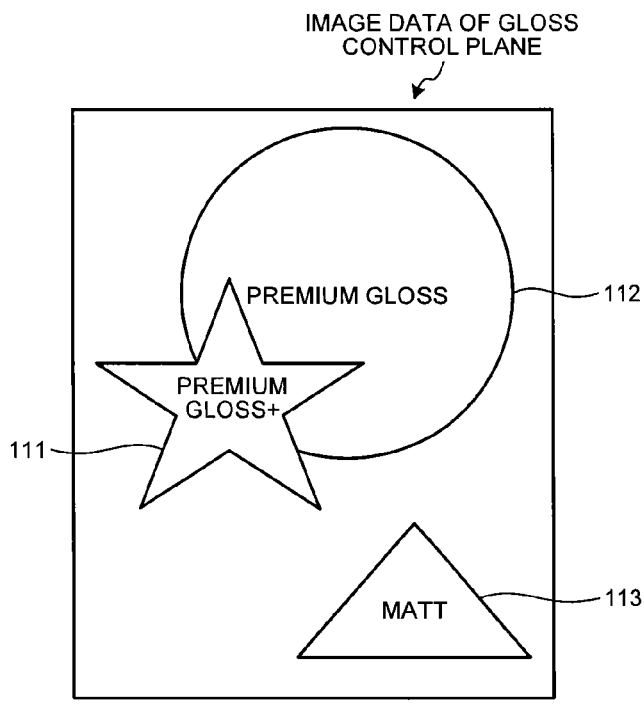

IMAGE DATA OF GLOSS CONTROL PLANE

- 112 PREMIUM GLOSS
- 111 PREMIUM GLOSS+
- 113 MATT

FIG.9

| | | TYPE OF SURFACE EFFECT (WITH PLUS DESIGNATION) DESIGNATED FOR TARGET AREA | | | |
|---|---|---|---|---|---|
| | | PREMIUM GLOSS PG+ | GLOSS G+ | MATT M+ | PREMIUM MATT PM+ |
| SURFACE EFFECT DESIGNATED FOR ADJACENT AREA | PREMIUM GLOSS PG | GLOSS G | MATT M | (PREMIUM GLOSS PG) | (PREMIUM GLOSS PG) |
| | GLOSS G | MATT M | MATT M | PREMIUM GLOSS PG | PREMIUM GLOSS PG |
| | MATT M | PREMIUM MATT PM | PREMIUM MATT PM | GLOSS G | GLOSS G |
| | PREMIUM MATT PM | (PREMIUM MATT PM) | (PREMIUM MATT PM) | GLOSS G | MATT M |

SURFACE EFFECT ULTIMATELY GIVEN TO ADJACENT AREA

| TYPE OF SURFACE EFFECT DESIGNATED FOR EACH REGION | DENSITY VALUE (%) OF GLOSS CONTROL PLANE |
|---|---|
| PG | 98% |
| G | 90% |
| M | 16% |
| PM | 6% |

| DRAWING OBJECT | COORDINATES | DENSITY VALUE |
|---|---|---|
| A, B, C | (x1, y1) - (x2, y2) | 98% |
| (RECTANGLE) | (x3, y3) - (x4, y4) | 90% |
| ... | ... | ... |

FIG.22

| DENSITY [%] | DENSITY REPRE-SENT-ING VALUE | NUME-RICAL RANGE | | EFFECT | GLOSSER ON/OFF (ON/OFF INFORMA-TION) | CLEAR TONER PLANE 1 (PRINTER MACHINE) | CLEAR TONER PLANE 2 (LOW-TEMPERATURE FIXING MACHINE) |
|---|---|---|---|---|---|---|---|
| 98% | 250 | 248 | 255 | PREMIUM GLOSS TYPE A | ON | INVERSE MASK A | NO DATA |
| 96% | 245 | 243 | 247 | PREMIUM GLOSS TYPE B | ON | INVERSE MASK B | NO DATA |
| 94% | 240 | 238 | 242 | PREMIUM GLOSS TYPE C | ON | INVERSE MASK C | NO DATA |
| 92% | 235 | 233 | 237 | RESERVED | | | |
| 90% | 230 | 228 | 232 | GLOSS TYPE 1 | OFF | INVERSE MASK 1 | NO DATA |
| 88% | 224 | 222 | 227 | GLOSS TYPE 2 | OFF | INVERSE MASK 2 | NO DATA |
| 86% | 219 | 217 | 221 | GLOSS TYPE 3 | OFF | INVERSE MASK 3 | NO DATA |
| 84% | 214 | 212 | 216 | GLOSS TYPE 4 | OFF | INVERSE MASK 4 | NO DATA |
| 82% | 209 | 207 | 211 | RESERVED | | | |
| 46% | 117 | 115 | 119 | RESERVED | | | |
| 44% | 112 | 110 | 114 | WATERMARK TEXT 3 (XXX) | OFF | NO DATA | TILE CHARACTER STRING 3 |
| 42% | 107 | 105 | 109 | WATERMARK TEXT 2 (REPRODUCTION PROHIBITED) | | NO DATA | TILE CHARACTER STRING 2 |
| 40% | 102 | 100 | 104 | WATERMARK TEXT 1 (SAMPLE) | | NO DATA | TILE CHARACTER STRING 1 |
| 38% | 97 | 95 | 99 | RESERVED | | | |
| 36% | 92 | 90 | 94 | RESERVED | | | |
| 34% | 87 | 85 | 89 | BACKGROUND PATTERN 3 (XXX) | | NO DATA | TILE BACKGROUND 3 |
| 32% | 82 | 80 | 84 | BACKGROUND PATTERN 2 (LATTICE) | | NO DATA | TILE BACKGROUND 2 |
| 30% | 76 | 74 | 79 | BACKGROUND PATTERN 1 (WAVE) | | NO DATA | TILE BACKGROUND 1 |
| 28% | 71 | 69 | 73 | RESERVED | | | |
| 26% | 66 | 64 | 68 | RESERVED | | | |
| 24% | 61 | 59 | 63 | TACTILE SENSE PATTERN TYPE 3 (ROUGH) | | NO DATA | TILE MESH DESIGN 3 |
| 22% | 56 | 54 | 58 | TACTILE SENSE PATTERN TYPE 2 (MEDIUM) | | NO DATA | TILE MESH DESIGN 2 |
| 20% | 51 | 49 | 53 | TACTILE SENSE PATTERN TYPE 1 (FINE) | | NO DATA | TILE MESH DESIGN 1 |
| 18% | 46 | 44 | 48 | RESERVED | | | |
| 16% | 41 | 39 | 43 | MATT TYPE 4 | OFF | HALFTONE 4 | NO DATA |
| 14% | 36 | 34 | 38 | MATT TYPE 3 | OFF | HALFTONE 3 | NO DATA |
| 12% | 31 | 29 | 33 | MATT TYPE 2 | OFF | HALFTONE 2 | NO DATA |
| 10% | 25 | 23 | 28 | MATT TYPE 1 | OFF | HALFTONE 1 | NO DATA |
| 8% | 20 | 18 | 22 | RESERVED | | | |
| 6% | 15 | 13 | 17 | PREMIUM MATT TYPE C | ON & OFF | NO DATA | SOLID |
| 4% | 10 | 8 | 12 | PREMIUM MATT TYPE B | ON & OFF | NO DATA | SOLID |
| 2% | 5 | 1 | 7 | PREMIUM MATT TYPE A | ON & OFF | NO DATA | SOLID |
| 0% | 0 | 0 | 0 | NONE | OFF | NO DATA | NO DATA |

# INFORMATION PROCESSING APPARATUS WITH IMAGE GENERATING UNIT GENERATING GLOSS-CONTROL PLANE DATA AND DESIGNATING EMPHASIS TO AN IMAGE REGION FOR GLOSSINESS CONTROL TO CHANGE SURFACE EFFECT OF RECORDING MEDIUM

CROSS-REFERENCE TO RELATED APPLICATIONS

The present application claims priority to and incorporates by reference the entire contents of Japanese Patent Application No. 2012-090584 filed in Japan on Apr. 11, 2012.

BACKGROUND OF THE INVENTION

1. Field of the Invention

The present invention relates to an information processing apparatus, a print control apparatus, and an image forming system.

2. Description of the Related Art

In the past, there is an image forming apparatus having not only toners of four colors, i.e., CMYK, but also clear toner which is colorless toner including no color material. A toner image formed with such clear toner is fixed onto a recording medium such as a transfer sheet on which an image is formed with CMYK toners, and as a result, visual effect and tactile sense effect (which will be referred to as surface effect) are achieved on a surface of the recording medium. Depending on what kind of toner image is formed with clear toner and how it is fixed, different surface effects are obtained. There are surface effects such as one that simply gives gloss or one that suppresses gloss. A surface effect given to the entire surface but also a surface effect given to a portion of the surface and a surface effect to apply texture and watermark with clear toner are sought for. Sometimes surface protection is sought for. There are some surface effects that can be made with post-processing by dedicated post-processing machines such as a glosser and a low-temperature fixing machine other than fixing control.

For example, Japanese Laid-open Patent Publication No. 2009-58941 discloses a method of changing the glossiness in accordance with how clear toner is placed. Japanese Laid-open Patent Publication No. 2010-152129 discloses a method of changing glossiness in accordance with the number of times fixing process is performed. As described above, gloss control methods of changing surface effect by improving the fixing method and how clear toner is placed are already known.

However, with the conventional glossiness control method described above, when the same type of surface effect is specified in overlapping areas or adjacent areas such as premium gloss and premium matt, the surface effects of the regions cannot be distinguished from each other, and therefore, there is a problem in that the surface effect of any one of the areas cannot be emphasized as compared with the surface effect of the other area.

In view of the above, there is a need to provide an information processing apparatus, a print control apparatus, and an image forming system that, even when the same type of surface effect is specified in adjacent or overlapping areas, the surface effect of one of the areas can be emphasized as compared with the surface effect of the other area.

SUMMARY OF THE INVENTION

It is an object of the present invention to at least partially solve the problems in the conventional technology.

An information processing apparatus generates print data to be printed onto a recording medium, on the basis of image data of gloss control plane including a type of a surface effect given to at least a region of the recording medium and coordinates to identify the region which is given the surface effect. The information processing apparatus includes: an image data generation unit that generates the image data of the gloss control plane including designation to emphasize, among a first region and a second region adjacent to each other on the recording medium, a surface effect of the first region as compared with a surface effect of the second region; a change unit that changes the surface effect of the second region when the designation to emphasis is given to the first region in the image data of the gloss control plane; a print data generation unit that generates print data on the basis of the image data of the gloss control plane in which the surface effect of the second region has been changed by the change unit; and an output unit that outputs the print data.

A print control apparatus generates image data to be printed onto a recording medium, on the basis of image data of gloss control plane including a type of a surface effect given to at least a region of the recording medium and coordinates to identify the region which is given the surface effect. The print control apparatus includes: a change unit that changes a surface effect of a second region, when the image data of the gloss control plane includes designation to emphasize, among a first region and the second region adjacent to each other, a surface effect of the first region as compared with the surface effect of the second region; a generation unit that generates the print data to be printed onto the recording medium on the basis of the image data of the gloss control plane in which the surface effect of the second region has been changed by the change unit; and an output unit that outputs the print data.

An image forming system generates image data to be printed onto a recording medium, on the basis of image data of gloss control plane including a type of a surface effect given to at least a region of the recording medium and coordinates to identify the region which is given the surface effect. The image forming system includes: a change unit that changes a surface effect of a second region, when the image data of the gloss control plane includes designation to emphasize, among a first region and the second region adjacent to each other, a surface effect of the first region as compared with the surface effect of the second region; a generation unit that generates the print data to be printed onto the recording medium on the basis of the image data of the gloss control plane in which the surface effect of the second region has been changed by the change unit; and an output unit that outputs the print data.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a figure illustrating an example of image data of gloss control plane;

FIG. 9 is a correspondence table illustrating an example of relationship between a surface effect (with plus designation) designated for a target area and a surface effect designated for an adjacent area adjacent to the target area;

FIG. 22 is a figure illustrating an example of data configuration of surface effect selection table;

DETAILED DESCRIPTION OF THE PREFERRED EMBODIMENTS

Figure 1:
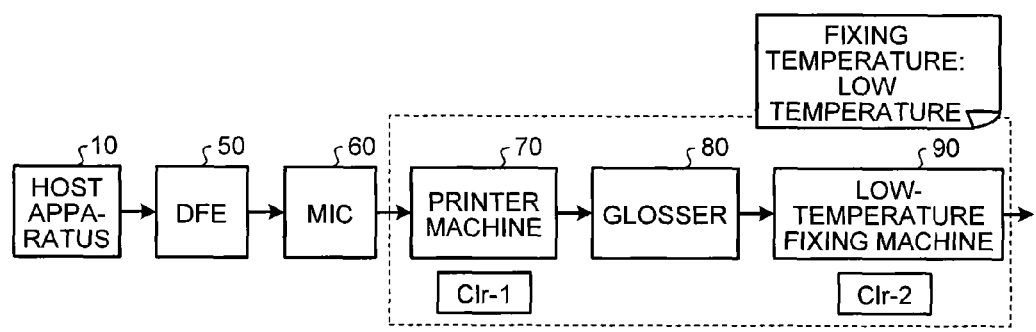
FIG. 1 is a figure illustrating an example of configuration of an image forming system according to a first embodiment.

Hereinafter, an embodiment of an information processing apparatus, a print control apparatus, an image forming system, a print control method, and a program according to this invention will be explained in detail with reference to appended drawings.

First Embodiment

First, a configuration of an image forming system according to the present embodiment will be explained with reference to FIG. 1. In the present embodiment, the image forming system is constituted by connecting a printer control apparatus (DFE: Digital Front End) 50 (hereinafter referred to as "DFE 50"), an interface controller (MIC: Mechanism I/F Contoroller) 60 (hereinafter referred to as "MIC 60"), a printer machine 70, and a glosser 80 and a low-temperature fixing machine 90 serving as post-processing machines. The DFE 50 communicates via the MIC 60 with the printer machine 70, and controls image formation with the printer machine 70. The DFE 50 is connected to a host apparatus 10 such as a PC (Personal Computer), and the DFE 50 receives image data from the host apparatus 10, and uses the image data to generate image data with which the printer machine 70 forms toner image according to each of CMYK toners and clear toner, and transmits the image data via the MIC 60 to the printer machine 70. The printer machine 70 is provided with at least the CMYK toners and the clear toner, and an image forming unit including a photosensitive element, a charger, a developing unit, and a photosensitive element cleaner, and an exposing unit, and fixing machine are provided for each toner.

In this case, the clear toner is transparent (colorless) toner including no color material. The term "transparent (colorless)" means, for example, transmittance of 70% or higher.

In the printer machine 70, toner image according to each of the toners is formed on the photosensitive element by causing the exposing unit to emit light beam in accordance with the image data transmitted via the MIC 60 from the DFE 50, and this is transferred to a sheet serving as a recording medium, and this is fixed with the fixing machine with heat application at a predetermined temperature range (normal temperature) and with pressure. Thus, the image is formed on the sheet. The sheet is an example of recording medium, and the recording medium is not limited thereto. For example, the recording medium may be, e.g., synthetic paper and plastic paper.

The glosser 80 is controlled between ON and OFF state in accordance with ON/OFF information designated by the DFE 50, and, when the glosser 80 is turned ON, the image formed on the sheet by the printer machine 70 is pressurized with high temperature and high pressure, and thereafter, it is cooled and the sheet formed with the image is separated from the main body. Thus, the total amount of attached toner of each pixel having a predetermined amount of toner or more attached thereto in the entire image formed on the sheet is uniformly compressed. The low-temperature fixing machine 90 includes an image forming unit including a photosensitive element, charger, a developing unit, and a photosensitive element cleaner for clear toner, and an exposing unit, and a fixing machine that fixes the clear toner, and receives image data of clear toner plane, explained later, generated by the DFE 50 for use in the low-temperature fixing machine 90. When the image data of the clear toner plane used by the low-temperature fixing machine 90 (clear toner plane data) are generated by the DFE 50, the low-temperature fixing machine 90 uses this to form the toner image with the clear toner, overlays the toner image on the sheet pressurized by the glosser 80, and fixes it onto the sheet with heat or pressure lower than ordinary heat or pressure with the fixing machine.

The image data received from the host apparatus 10 (original document data) will be explained. The host apparatus 10 generates image data using an image processing application (an image processing unit 120, a plane data generation unit 122, a print data generation unit 123 and the like) installed in advance, and the image data are transmitted to the DFE 50. In such image processing application, in contrast to image data in which a value of density (which will be referred to as density value) of each color in each color plane such as RGB and CMYK is defined for each pixel, image data of special color plane can be supported. The special color plane is image data to attach special toner and ink such as white, gold, and silver in addition to basic colors such as CMYK and RGB, and are data for a printer having such special toner and ink. In the special color plane, R may be added to basic colors of CMYK, and Y may be added to basic colors of RGB, in order to improve the color reproducibility. Normally, the clear toner is treated as one of the special colors.

In the present embodiment, the clear toner serving as the special color is used in order to form the surface effect which is visual or tactile sense effect given to a sheet and in order to form not only the above surface effect but also a transparent image such as watermark and texture onto the sheet.

Accordingly, from the received image data, the image processing application of the host apparatus 10 generates not only the image data of the color plane but also image data of gloss control plane and/or image data of clear plane in accordance with designation by the user as image data of special color plane.

Figure 2:
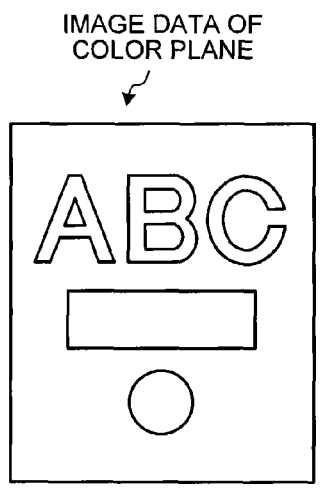
FIG. 2 is a figure illustrating an example of image data of color plane.

In this case, the image data of the color plane are image data in which color density values such as RGB and CMYK are designated for each pixel. In the image data of the color plane, one pixel is represented by eight bits in accordance with the designation of color by the user. FIG. 2 is a figure illustrating an example of image data of color plane. In FIG. 2, for each drawing objects such as "A", "B", and "C", a density value corresponding to a color designated by the user with the image processing application is given.

The image data of the gloss control plane are image data to identify the region where the surface effect is given and the type of surface effect in order to perform control to attach the clear toner in accordance with the surface effect which is visual or tactile sense effect given to the sheet.

Like the color plane such as RGB and CMYK, this gloss control plane is represented with a density value in a range of "0" to "255" using eight bits for each pixel, and the type of surface effect is associated with this density value (density value may be represented as 16 bits, 32 bits, or 0 to 100%). In a range where the same surface effect is desired to be given, the same value is set regardless of the density of the clear toner actually attached, and therefore, the region can be identified easily from the image data as necessary even without data indicating the region. More specifically, the gloss control plane represents the type of surface effect and the region where the surface effect is given (data representing the region may be given separately).

In this case, the host apparatus 10 generates the image data of the gloss control plane (gloss control plane data) in vector format by setting the type of surface effect set for the drawing object designated by the user with the image processing application, as a density value serving as a gloss control value for each drawing object.

Each pixel constituting the image data of the gloss control plane corresponds to a pixel of the image data of the color plane. In each of the image data, the density value represented by each pixel is a pixel value. The image data of the color plane and the gloss control plane are both constituted in units of pages.

Figures 3, 4:
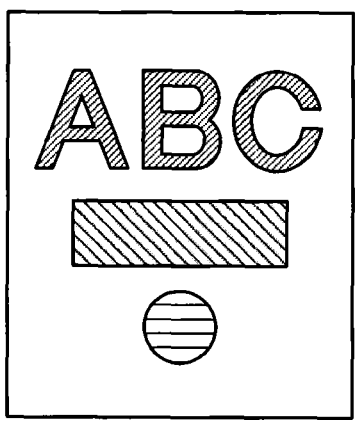
FIG. 3 is a figure illustrating an example of the types of surface effects with regard to presence/absence of gloss.
FIG. 4 is a figure illustrating image data of gloss control plane as an image.

When the type of surface effect is roughly classified, examples of types of surface effects include those regarding presence/absence of gloss, surface protection, watermark embedded with information, and texture. As illustrated in FIG. 3, for example, there are roughly four types of surface effects regarding presence/absence of the gloss, which include premium gloss (PG), gloss (G), matt (M), and premium matt (PM), which are arranged in the descending order of the degree of gloss (glossiness). Hereinafter, the premium gloss may be referred to as "PG", the gloss may be referred to as "G", the matt may be referred to as "M", and the premium matt may be referred to as "PM".

The premium gloss and the gloss have a high degree of gloss given, and on the contrary, the matt and the premium matt are to suppress the gloss. In particular, the premium matt achieves lower level of glossiness than glossiness of ordinary sheets. In the same figure, the premium gloss has a glossiness Gs of 80 or higher, the gloss has a glossiness of primary color or secondary color, the matt has a glossiness of primary color with halftone dot of 30%, and the matt has a glossiness of 10 or less. The deviation of glossiness is represented as ΔGs, which is 10 or less. For the types of surface effects explained above, a higher density value is associated with a surface effect giving a higher degree of gloss, and a lower density value is associated with a surface effect suppressing the gloss. A density value inbetween is associated with a surface effect such as watermark and texture. Examples of watermarks include characters and background pattern. The textures represent characters and patterns, and can give not only visual effect but also tactile sense effect. For example, a pattern of stained glass can be made with the clear toner. The premium gloss and the gloss are substituted for the surface protection. Which region of the image represented by the image data which are to be processed the surface effect is given and what kind of surface effect is given to that region are designated by the user with the image processing application. In the host apparatus 10 executing the image processing application, the density value corresponding to the surface effect designated by the user is set with regard to the drawing object constituting the region designated by the user, and accordingly the image data of the gloss control plane are generated. The corresponding relationship between the density value and the type of surface effect will be explained later.

FIG. 4 is an explanatory diagram illustrating an example of image data of gloss control plane. The example of gloss control plane of FIG. 4 illustrates an example in which the user gives surface effect "PG (premium gloss)" to a drawing object "ABC", surface effect "G (gloss)" to a drawing object "(rectangular figure)", and surface effect "M (matt)" to a drawing object "(circular figure)". It should be noted that the density value set for each surface effect is a density value defined in association with the type of surface effect in a density value selection table (see FIG. 12) explained later.

Figure 5:
FIG. 5 is a figure illustrating an example of image data of clear plane.

The image data of the clear plane are image data identifying transparent image such as watermark and texture other than the above surface effects. FIG. 5 is an explanatory diagram illustrating an example of image data of clear plane. In the example of FIG. 5, the user designates watermark "Sale".

As described above, the image data of the gloss control plane and the clear plane which are image data of special color plane are generated by the image processing application of the host apparatus 10 in a plane different from that of the image data of the color plane. PDF (Portable Document Format) format is used as the format of each of the image data of the color plane, the image data of the gloss control plane, and the image data of the clear plane, but the image data of the PDF of each plane is combined to generate original document data. The data format of the image data of each plane is not limited to PDF, and any format may be used.

Figure 6:
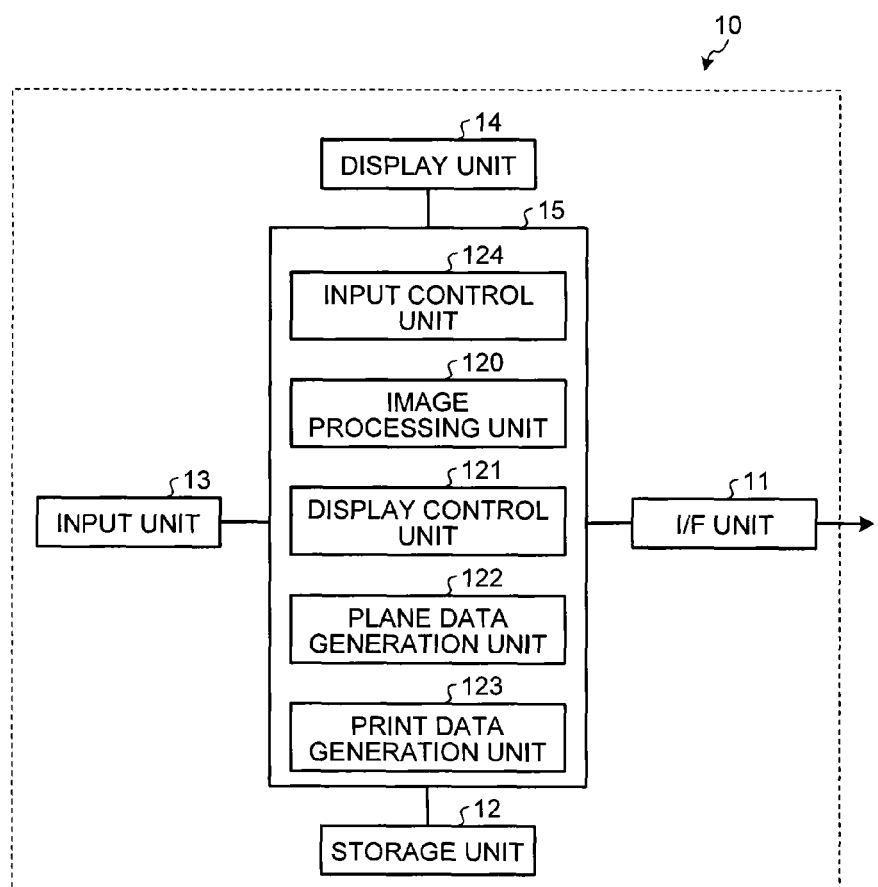
FIG. 6 is a block diagram illustrating a schematic configuration example of a host apparatus.

Subsequently, the details of the host apparatus 10 generating image data of each plane as described above will be explained. FIG. 6 is a block diagram illustrating a schematic configuration example of the host apparatus 10. As illustrated in FIG. 6, the host apparatus 10 includes an I/F unit 11, a storage unit 12, an input unit 13, a display unit 14, and a control unit 15. The I/F unit 11 is an interface device to communicate with the DFE 50. The storage unit 12 is a storage medium such as a hard disk drive device (HDD) and a memory storing various kinds of data. The input unit 13 is an input device with which the user performs various kinds of operation inputs, and, for example, the input unit 13 may be constituted by a keyboard and a mouse. The display unit 14 is a display device to display various kinds of screens, and may be constituted by, for example, a liquid crystal panel.

The control unit 15 controls the entire host apparatus 10, and is a computer configured to include, e.g., a CPU, a ROM and a RAM. As illustrated in FIG. 6, the control unit 15 mainly includes an input control unit 124, an image processing unit 120, a display control unit 121, a plane data generation unit 122, and a print data generation unit 123. Among the above units, the input control unit 124 and the display control unit 121 are achieved by causing the CPU of the control unit 15 to read a program of operating system stored in the ROM and the like and extract and execute the program on the RAM. The image processing unit 120, the plane data generation unit 122, and the print data generation unit 123 are achieved by causing the CPU of the control unit 15 to read the program of the image processing application explained above stored in the ROM and the like and extract and execute the program on the RAM. In this case, for example, the plane data generation unit 122 is provided as a function of plug-in installed to the image processing application. At least some of these units may be achieved with individual circuits (hardware).

The input control unit 124 receives various kinds of inputs from the input unit 13 and controls the input. For example, the user operates the input unit 13 to input image designation information to designate one of various kinds of image stored in the storage unit 12 to which surface effect is to be given (for example, picture, character, figure, an image obtained by compositing them), i.e., the image data of the color plane (which may be hereinafter referred to as "target image"). However, the input method of the image designation information is not limited thereto, and may be any method.

The display control unit 121 controls display of various kinds of information on the display unit 14. In the present embodiment, when the input control unit 124 receives the image designation information, the display control unit 121 reads the image designated by the image designation information from the storage unit 12, and controls the display unit 14 to display the read image onto the screen.

While the user confirms a target image displayed on the display unit 14, the user operates the input unit 13, thereby inputting designation information to designate the region where surface effect is given and the type of surface effect. However, the input method of the designation information is not limited thereto, and may be any method.

Figure 7:
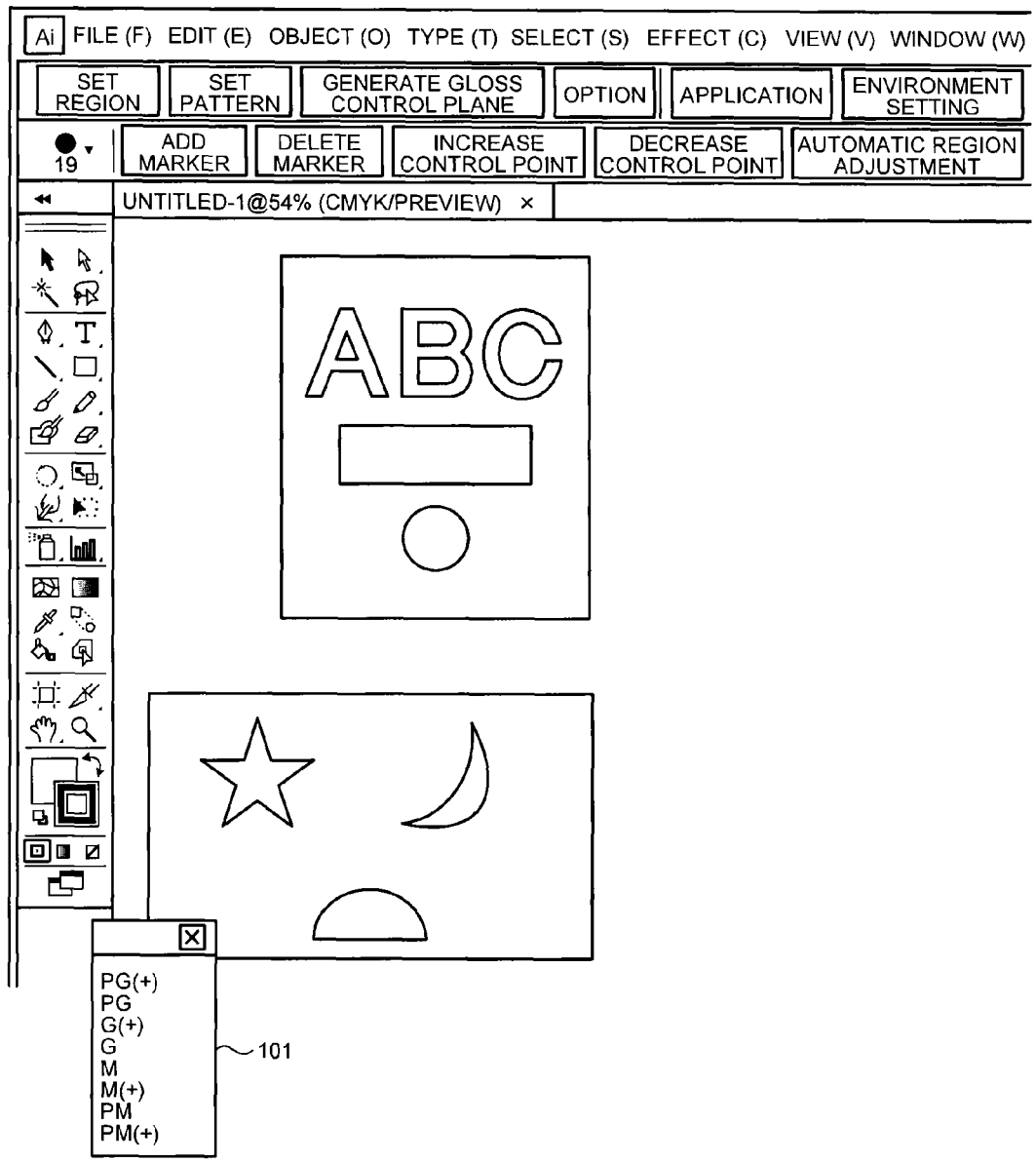
FIG. 7 is a figure illustrating an example of screen displayed by an image processing application.

More specifically, the display control unit 121 displays, for example, the screen displayed on the display unit 14 as an example in FIG. 7. This FIG. 7 is an example of screen displayed when a plug-in is incorporated into Illustrator sold by Adobe Systems Incorporate (R). An image represented by target image data (the image data of the color plane) which is the processing target is displayed on the screen as illustrated in FIG. 7, and the user presses down a marker addition button via the input unit 13, and performs operation input to designate the region to which the user wants to give the surface effect, thus designating the region where surface effect is given. The user performs such operation input on all the regions to which the surface effects are given.

For example, the surface effect to each region may be designated in such a manner that, while a target region is selected, the user uses the input unit 13 to select the surface effect. For example, options of surface effects may be displayed as a list in a control tool box 101 as illustrated in FIG. 7. Premium gloss PG, gloss G, matt M, and premium matt PM are displayed as the options of surface effects in a control tool box 101 as illustrated in FIG. 7. In addition, premium gloss PG+, gloss G+, matt M+, and premium matt PM+ are also displayed as options of surface effects in the control tool box 101 as illustrated in FIG. 7, and premium gloss PG+, gloss G+, matt M+, and premium matt PM+ are used to input commands to emphasize the surface effect for the region (which may be hereinafter referred to as target area) of the target as compared with the surface effect of other region (which may be hereinafter simply referred to as adjacent area) adjacent to the target area. In this explanation, a command to emphasize the surface effect of the target area as compared with the surface effect of the adjacent area will be referred to as plus designation. The region for which the surface effect is designated is also referred to as a gloss control area, and a region of the gloss control area where the surface effect of the plus designation is designated will be referred to as a plus designation area.

Among the above surface effects, for example, premium gloss PG, gloss G, premium gloss PG+, and gloss G+ are surface effects to increase the glossiness of the target area as compared with the surface effect of glossiness of a sheet. On the other hand, for example, matt M, premium matt PM, matt M+ and premium matt PM+ are surface effects to reduce the glossiness of the target area as compared with the surface effect of glossiness of a sheet. It should be noted that the premium gloss (PG, PG+) has higher glossiness than the gloss (G, G+), and the premium matt (PM, PM+) has lower glossiness than the matt (M, M+).

Figure 10:
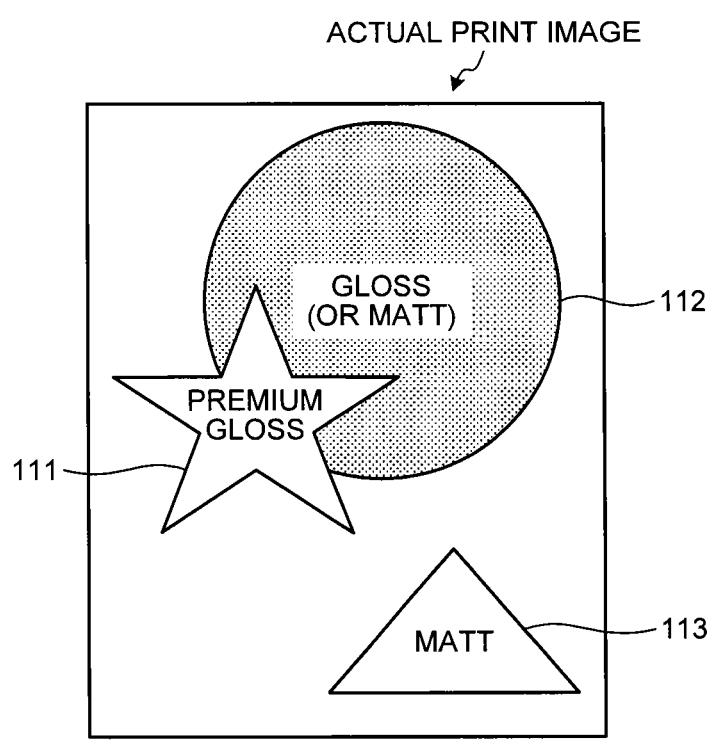
FIG. 10 is a figure illustrating an example of an image actually printed after the surface effect is changed.

In the present embodiment, when a surface effect including the plus designation is designated for a certain target area, the surface effect set for the adjacent area is changed in order to emphasize the surface effect of the target area. Hereinafter, an example of changed surface effect that is set for an adjacent area when the surface effect of the plus designation is designated for a certain target area will be explained with reference to FIGS. 8 to 10. FIG. 8 is a figure illustrating an example of image data of gloss control plane. FIG. 9 is a correspondence table illustrating an example of relationship between a surface effect (with plus designation) designated for a target area and a surface effect designated for an adjacent area adjacent to the target area. FIG. 10 is a figure illustrating an example of an image actually printed after the surface effect is changed.

The image data of the gloss control plane as illustrated in FIG. 8 includes a star-shaped region 111, a circular region 112, and a triangular region 113. The star-shaped region 111 is overlaid on or adjacent to the circular region 112. Therefore, the circular region 112 is an adjacent area adjacent to the star-shaped region 111, the star-shaped region 111 is an adjacent area adjacent to the circular region 112. On the other hand, suppose that the triangular region 113 is neither overlaid on nor adjacent to the star-shaped region 111 and the circular region 112. In this case, suppose that the premium gloss PG is designated for the circular region 112, and the premium gloss PG+ is designated for the star-shaped region 111. In this case, for example, according to the correspondence table of FIG. 9, the surface effect of the region 112 which is the adjacent area of the region 111 is changed from the premium gloss PG to the gloss G having glossiness lower than the premium gloss PG. As a result, as illustrated in FIG. 10, an image is printed in which the premium gloss PG is applied to the region 111, the gloss G is applied to the region 112, and the matt M is applied to the region 113.

As described above, in the present embodiment, when the surface effect of the plus designation to increase the glossiness (premium gloss PG+, gloss G+) is designated for the target area, the surface effect of the adjacent area is changed to a surface effect having glossiness lower than the currently designated surface effect. When the surface effect of the plus designation to reduce the glossiness (matt M+, premium matt PM+) is designated for the target area, the surface effect of the adjacent area is changed to a surface effect having glossiness higher than the currently designated surface effect. The surface effect for the adjacent area may be applied in one step of two or more steps. For example, when the gloss G is changed to a surface effect having glossiness lower than the gloss G, the surface effect may be changed as follows: when the step of change is one step, the surface effect after the change is the matt M, and when the step of change is two steps, the surface effect after the change is the premium matt PM. When the surface effect of the adjacent area is changed, a surface effect designated for another region adjacent to this adjacent area may be further taken into consideration.

When there are multiple plus designation areas adjacent to the adjacent area, the surface effect of the adjacent area may be changed in a stepwise manner in order in accordance with each of the plus designation areas. Alternatively, when the surface effects given to multiple plus designation area adjacent to the adjacent area are surface effects to increase the glossiness, the surface effect of the adjacent area may be changed in accordance with one of the surface effects having the lowest glossiness. On the other hand, when the surface effects given to multiple plus designation areas are surface effects to reduce the glossiness, the surface effect of the adjacent area may be changed in accordance with one of the surface effects having the highest glossiness. Further, when there are both of a plus designation area given a surface effect to increase the glossiness and a plus designation area given a surface effect to reduce the glossiness, a surface effect of glossiness therebetween may be given to the adjacent area. At this occasion, options of surface effects given to the adjacent area may include an option of "no surface effect (the density of the clear toner is zero)".

Figure 11:
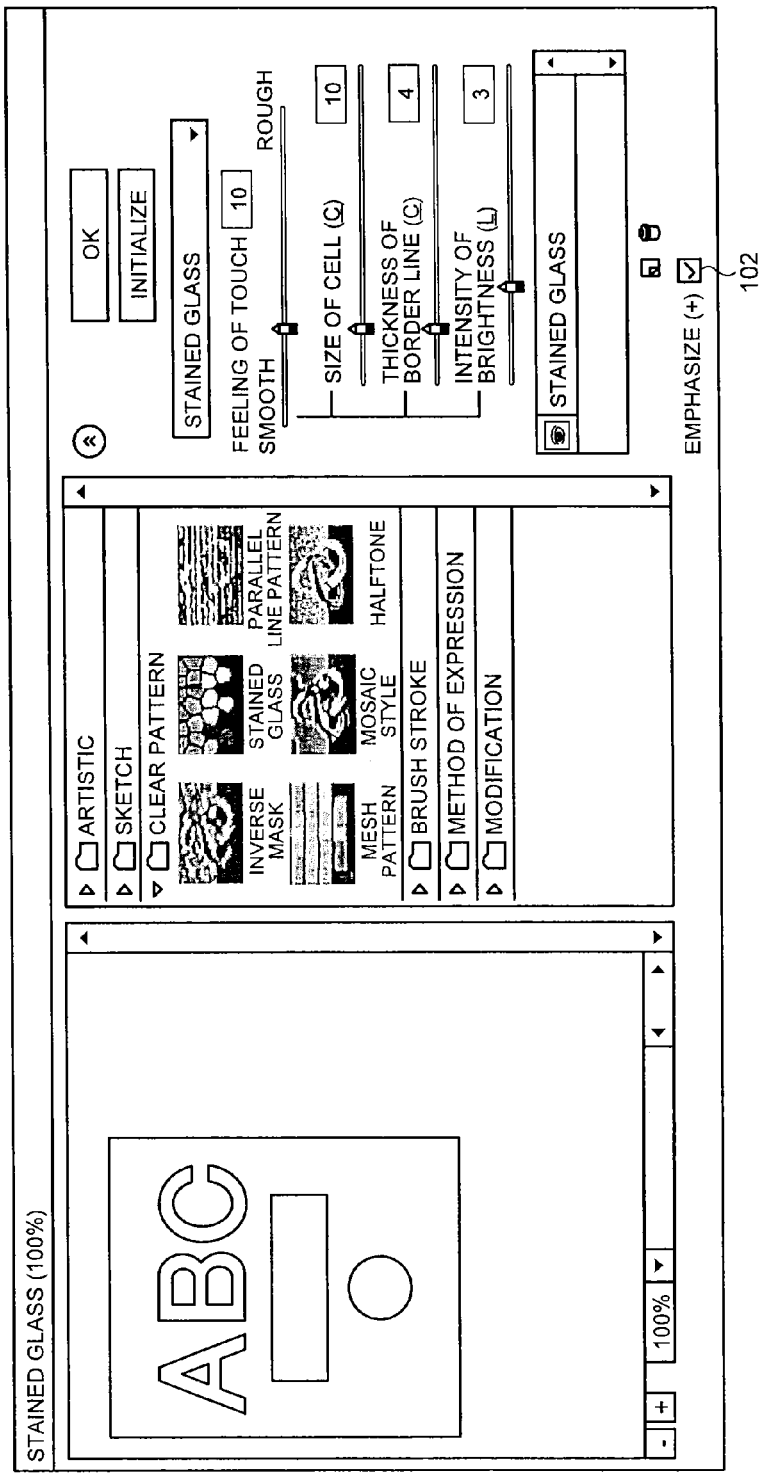
FIG. 11 is a figure illustrating an example of screen displayed by an image processing application.

The designation of the surface effect of each region may be done using a screen illustrated in FIG. 11 as an example instead of the control tool box 101 as illustrated in FIG. 7. In such case, for example, the display control unit 121 of the host apparatus 10 displays a screen as illustrated in FIG. 11 as an example on the display unit 14, for each region designated. In the screen as illustrated in FIG. 11, an image of a region is displayed in each region designated as giving a surface effect, and operation input to designate the type of surface effect which is to be given to the image is performed with the input unit 13, so that the type of surface effect given to the region is designated. As the type of surface effect, the premium gloss and the gloss of FIG. 3 are represented as "inverse mask" in FIG. 11, and other effects except the premium gloss and the gloss of FIG. 3 are represented as stained glass, line pattern, mesh pattern, mosaic style, matt, and halftone of FIG. 11, and it is illustrated that each surface effect can be designated. In the screen as illustrated in FIG. 11, while any one of the surface effects (PG, G, M, PM) is selected, a radio box 102 for emphasis (+) is turned on, so that the surface effect for the selected region can be set as the surface effect of the plus designation (PG+, G+, M+, PM+).

Back to FIG. 6, the image processing unit 120 performs various kinds of image processing on the basis of the commands given by the user with the input unit 13 with regard to the target image.

The plane data generation unit 122 generates the image data of the color plane, the image data of the gloss control plane, and the image data of the clear plane. More specifically, when the input control unit 124 receives color designation from the user with regard to the drawing object of the target image, the plane data generation unit 122 generates the image data of the color plane in accordance with the color designation.

When the input control unit 124 receives designation of a transparent image such as watermark and texture other than the surface effect and of a region to which the transparent image is given, the plane data generation unit 122 generates the image data of the transparent image and the clear plane to identify a region on a sheet to which the transparent image is given in accordance with the designation given by the user.

When the input control unit 124 receives designation information (the region where surface effect is given and the type of surface effect), the plane data generation unit 122 identifies the surface effect given to each region from the designation information, and generates the image data of the gloss control plane capable of identifying the region where the surface effect is given on the sheet and the type of surface effect, on the basis of the surface effect for each of the regions identified. In this case, the plane data generation unit 122 generates the image data of the gloss control plane in which the region where the surface effect is given indicated by the gloss control value is designated in units of drawing objects of the image data of the target image.

Figures 12, 13:
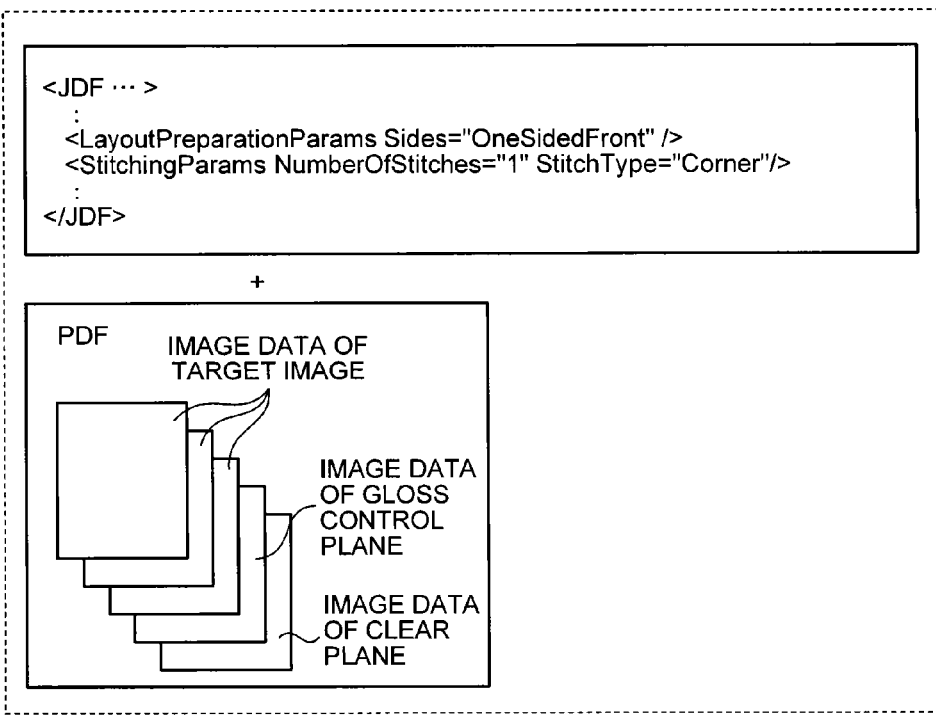
FIG. 12 is a figure illustrating an example of a density value selection table.
FIG. 13 is a schematic diagram schematically illustrating a configuration example of print data.

In this case, the storage unit 12 stores a density value selection table holding the type of surface effect designated for each region and the density value of the gloss control plane corresponding to the type of surface effect. FIG. 12 is a figure illustrating an example of a density value selection table. In the example of FIG. 12, the density value of the gloss control plane corresponding to the region where "PG" (premium gloss) is designated is "98%", the density value of the gloss control plane corresponding to the region where "G" (gloss) is designated is "90%", the density value of the gloss control plane corresponding to the region where "M" (matt) is designated is "16%", and the density value of the gloss control plane corresponding to the region where "PM" (premium matt) is designated is "6%".

This density value selection table is partial data of a surface effect selection table (explained later) stored in the DFE 50, and the control unit 15 obtains the surface effect selection table with predetermined timing, and the density value selection table is generated from the obtained surface effect selection table and saved in the storage unit 12. The surface effect selection table may be saved to a storage server (cloud) on a network such as the Internet, and the control unit 15 may be configured to obtain the surface effect selection table from the server, and generate the density value selection table from the obtained surface effect selection table. However, the surface effect selection table stored in the DFE 50 and the surface effect selection table saved in the storage unit 12 need to be the same data.

Back to FIG. 6, while the plane data generation unit 122 looks up the density value selection table as illustrated in FIG. 12, the plane data generation unit 122 sets, at a value according to the type of surface effect, the density value (gloss control value) of the drawing object for which predetermined surface effect is designated by the user, thus generating the image data of the gloss control plane. For example, suppose a case where the user designates "PG" given to the region displayed as "ABC", "G" given to the rectangular region, and "M" given to the circular region in the target image which is the image data of the color plane as illustrated in FIG. 2. In this case, the plane data generation unit 122 configures as follows: the density value of the drawing object ("ABC") for which "PG" is designated by the user is set at "98%", the density value of the drawing object ("rectangle") for which "G" is designated by the user is set at "90%", and the density value of the drawing object ("circle") for which "M" is designated by the user is set at "16%", thus generating the image data of the gloss control plane. The image data of the gloss control plane generated by the plane data generation unit 122 are data in a vector format expressed as a set of coordinates of points, parameters in equations of lines and surfaces connecting them, and drawing objects indicating filling and special effects. FIG. 4 is a figure illustrating the image data of the gloss control plane as an image. The plane data generation unit 122 generates original document data by uniting the image data of the gloss control plane, image data of the target image (the image data of the color plane), and the image data of the clear plane, and gives the original document data to the print data generation unit 123.

The print data generation unit 123 generates print data on the basis of the original document data. The print data are configured to include the image data of the target image (the image data of the color plane), the image data of the gloss control plane, the image data of the clear plane, and job commands to designate, e.g., setting of the printer, setting of aggregation, and setting of both sides with the printer. FIG. 13 is a schematic diagram schematically illustrating a configuration example of print data. In the example of FIG. 13, JDF (Job Definition Format) is used as a job command, but is not limited thereto. The JDF as illustrated in FIG. 13 is a command to designate "one side print/with staple" as setting of aggregation. The print data may be converted into a page-description language (PDL) such as PostScript, or if the DFE 50 supports the PDF format, the print data may be in the PDF format as it is.

Figure 14:
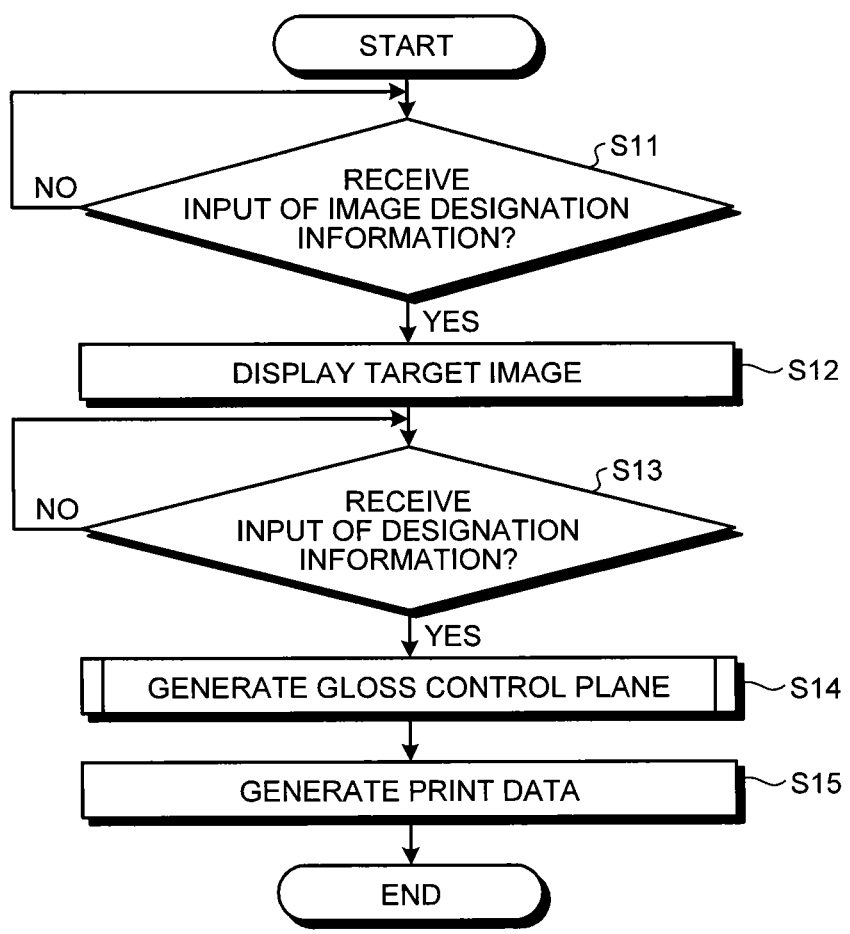
FIG. 14 is a flowchart illustrating a procedure of generation processing of print data by a host apparatus according to the first embodiment.

Subsequently, generation processing of the print data by the host apparatus 10 configured as described above will be explained. FIG. 14 is a flowchart illustrating a procedure of generation processing of print data by the host apparatus 10 according to the first embodiment. In the example of processing illustrated below, an example will be explained where no transparent image is designated and accordingly the image data of the clear plane are not generated.

First, when the input control unit 124 receives input of image designation information (step S11; Yes), the display control unit 121 controls the display unit 14 to display the image designated by the received image designation information (step S12). Subsequently, when the input control unit 124 receives input of the designation information of the surface effect (step S13; Yes), the plane data generation unit 122 generates the image data of the gloss control plane on the basis of the received designation information (step S14).

Figure 15:
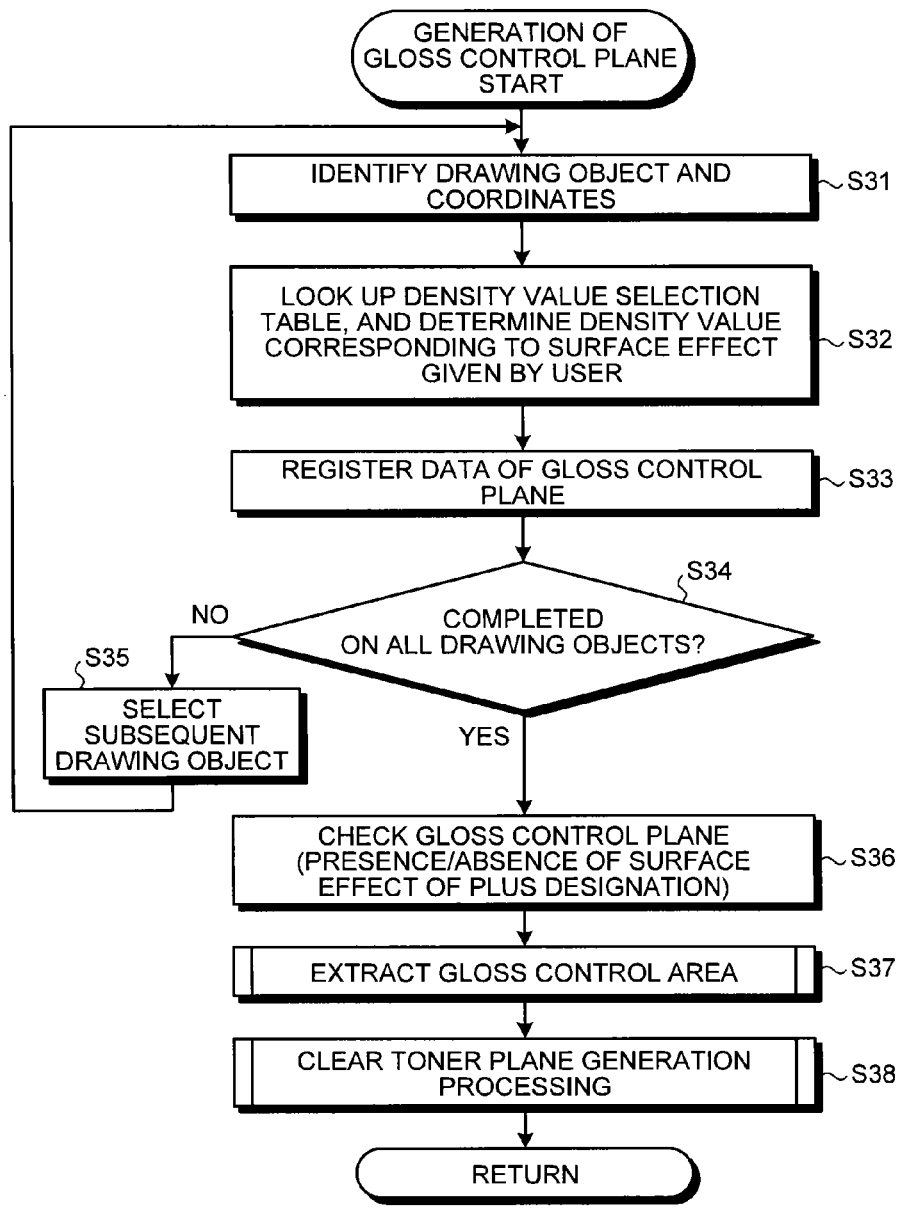
FIG. 15 is a flowchart illustrating procedure of generation processing of gloss control plane.

Hereinafter, the details of generation processing of the gloss control plane in step S14 will be explained. FIG. 15 is a flowchart illustrating procedure of the generation processing of the gloss control plane. First, the plane data generation unit 122 identifies a drawing object given the surface effect and the coordinates thereof in the target image using the designation information (step S31). The drawing object and the coordinates are identified using a coordinate value and the like set by a drawing command and a drawing command provided by an operating system and the like when the drawing object is drawn in the target image by the image processing unit 120, for example.

Subsequently, the plane data generation unit 122 looks up the density value selection table saved in the storage unit 12 to determine the density value serving as the gloss control value corresponding to the surface effect given by the user as the designation information (step S32).

Then, the plane data generation unit 122 registers the drawing object and the density value determined in accordance with the surface effect in a manner associated with each other as the image data of the gloss control plane (which are originally vacant data) (step S33).

Subsequently, the plane data generation unit 122 determines whether the processing from steps S31 to S33 explained above have been completed or not with regard to all the drawing objects existing in the target image (step S34). Then, when not completed (step S34; No), the plane data generation unit 122 selects a subsequent drawing object that is not yet processed in the target image (step S35), and repeatedly executes the processing from steps S31 to S33.

Figures 16, 17:
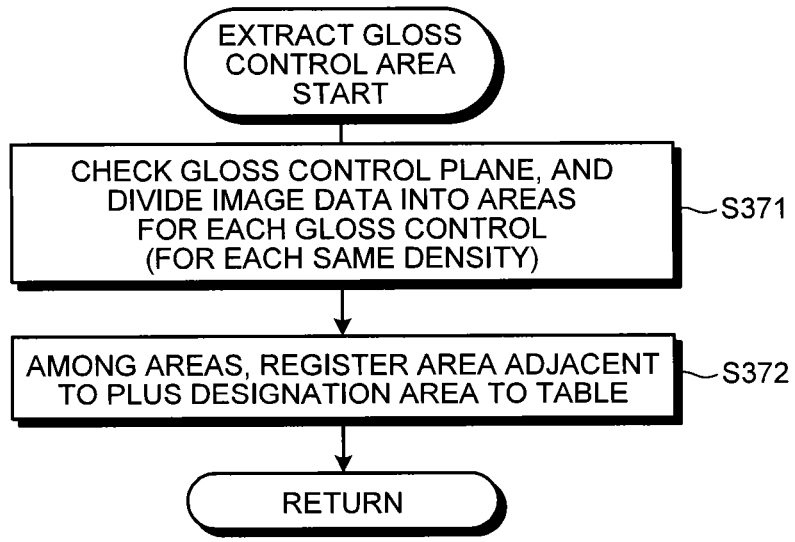
FIG. 16 is a figure illustrating corresponding relationship of drawing objects, coordinates, density values in image data of gloss control plane of FIG. 4.
FIG. 17 is a flowchart illustrating an example of extraction processing of a gloss control area as shown in step S37 of FIG. 15.

Then, in step S34, when the processing from steps S31 to S33 are determined to have been completed with regard to all the drawing objects in the target image (step S34; Yes), a checking is made to determine whether there is a region where the surface effect of the plus designation is given to the image data of the gloss control plane (step S36). Subsequently, the plane data generation unit 122 executes processing to extract a region (gloss control area) given the surface effect (step S37). Subsequently, the plane data generation unit 122 executes processing to generate the clear toner plane on the basis of the extracted gloss control area (step S38), and thereafter, the generation of the image data of the gloss control plane is completed. Accordingly, the image data of the gloss control plane as illustrated in FIG. 4 are generated. FIG. 16 is a figure illustrating corresponding relationship of drawing objects, coordinates, density values in the image data of the gloss control plane of FIG. 4.

Back to FIG. 14, when the image data of the gloss control plane are generated, the plane data generation unit 122 generates original document data by combining the image data of the gloss control plane and the image data of the target image and gives the original document to the print data generation unit 123. Then, the print data generation unit 123 generates print data based on the original document data (step S15). Thus, the printing data are generated.

Figure 18:
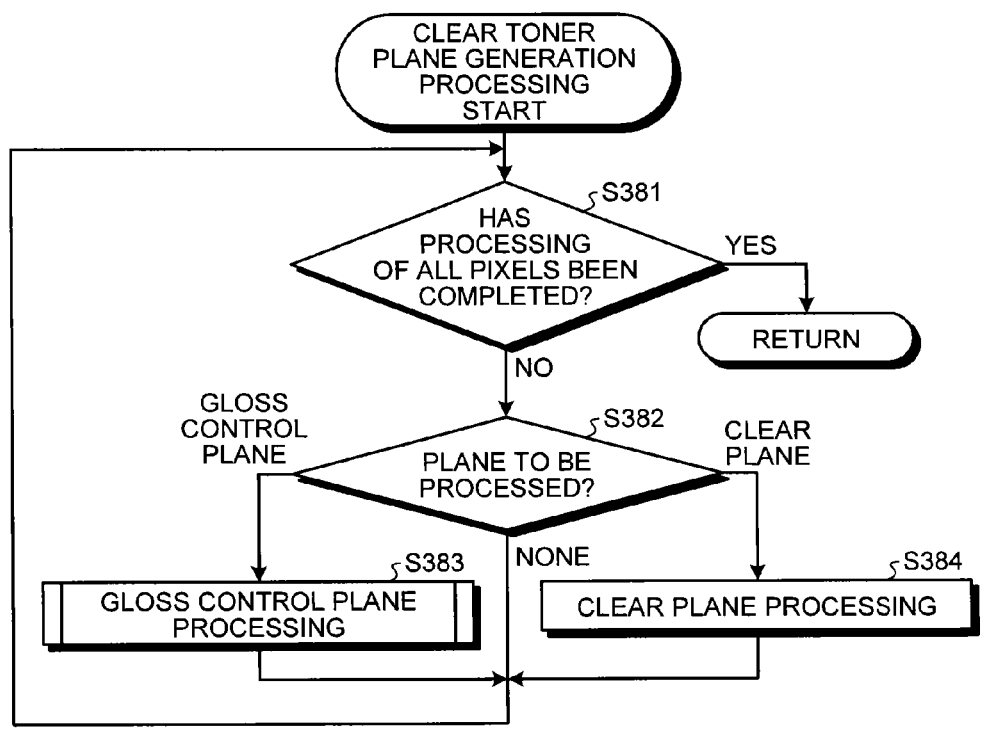
FIG. 18 is a flowchart illustrating an example of clear toner generation processing as shown in step S38 of FIG. 15.
Figure 19:
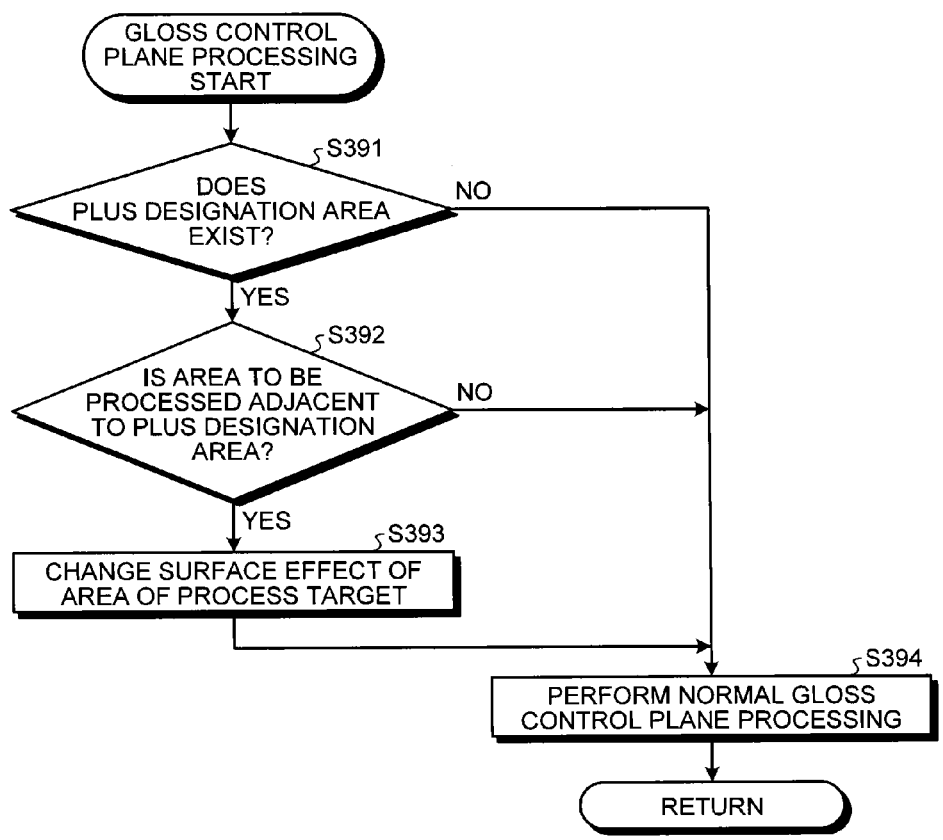
FIG. 19 is a flowchart illustrating an example of gloss control processing as shown in step S383 of FIG. 18.

Now, the processing as illustrated in steps S37 and S38 of FIG. 15 will be explained. FIG. 17 is a flowchart illustrating an example of extraction processing of a gloss control area as illustrated in step S37 of FIG. 15. FIG. 18 is a flowchart illustrating an example of clear toner generation processing as illustrated in step S38 of FIG. 15. FIG. 19 is a flowchart illustrating an example of gloss control processing as illustrated in step S383 of FIG. 18.

As illustrated in FIG. 17, in the extraction processing of the gloss control area, the plane data generation unit 122 checks the image data of the gloss control plane, thus identifying the surface effect (gloss control) set for each region, and divides the image data of the gloss control plane into regions having the same density (glossiness, i.e., surface effect) is set, on the basis of the surface effect of each of the identified regions (step S371). Subsequently, the plane data generation unit 122 identifies one of the divided regions (plus designation area) where the surface effect of the plus designation is designated, identifies an adjacent area adjacent to the identified plus designation area, and registers the identified adjacent area to a table, not illustrated, (step S372), and thereafter, returns back to operation as illustrated in FIG. 15. As a result, information to identify the region where the surface effect of the plus designation is given is registered to the table (not illustrated).

In the clear toner plane generation processing as illustrated in step S38 of FIG. 15, as illustrated in FIG. 18, first, the plane data generation unit 122 determines whether the processing has been done on all the pixels (step S381), when the processing has been completed on all the pixels (step S381; Yes), the plane data generation unit 122 returns back to operation as illustrated in FIG. 15. On the other hand, when the processing has not yet been completed on all the pixels (step S381; No), the plane data generation unit 122 identifies one of the planes of the gloss control plane and the clear plane which is to be processed (step S382). When the identified plane which is to be processed is the gloss control plane (step S382; gloss control plane), the plane data generation unit 122 executes processing on the image data of the gloss control plane (step S383), and returns back to step S381. It should be noted that the processing performed on the image data of the gloss control plane will be explained with reference to FIG. 19 explained later. When the identified plane which is to be processed is the clear plane (step S382; clear plane), the plane data generation unit 122 executes normal processing on the clear plane (step S384), and returns back to step S381. When there is no identified plane which is to be processed (step S382; none), the plane data generation unit 122 returns back to step S381 without any processing. Accordingly, the image data of the clear toner plane including the image data of the gloss control plane and the image data of the clear plane are generated.

In the gloss control processing as illustrated in step S383 of FIG. 18, as illustrated in FIG. 19, the plane data generation unit 122 looks up a table used in step S372 of FIG. 17, whereby determining whether there is plus designation area or not (step S391), and when there is no plus designation area (step S391; No), normal processing is executed on the region of the processing target (step S394), and thereafter, the plane data generation unit 122 returns back to operation as illustrated in FIG. 18. When there is the plus designation area (step S391; Yes), the plane data generation unit 122 determines whether the region of the processing target is adjacent to the plus designation area (step S392), and when it is not adjacent thereto (step S392; No), normal processing is executed on the region of the processing target (step S394), and thereafter, the plane data generation unit 122 returns back to operation as illustrated in FIG. 18. On the other hand, when the region of the processing target is an adjacent area adjacent to the plus designation area (step S392; Yes), the plane data generation unit 122 changes the surface effect of the region of the processing target in accordance with the rule explained with reference to FIGS. 8 to 10 explained above (step S393), and thereafter, proceeds to step S394 to execute normal processing on the region of the processing target after the change of the surface effect, and returns back to operation as illustrated in FIG. 18. As a result, in the image data of the gloss control plane, the surface effect of the adjacent area adjacent to the plus designation area is changed, and as a result, the surface effect of the plus designation area becomes the surface effect emphasized as compared with the adjacent area in terms of appearance.

As described above, in the first embodiment, the surface effect of the adjacent area adjacent to the plus designation area is changed to the surface effect that is different from the surface effect of the plus designation area, and therefore, even when the same type of surface effect is designated for the adjacent region, the surface effect of one of the regions can be the surface effect emphasized as compared with the surface effect of the other of the regions in terms of appearance.

Figure 20:
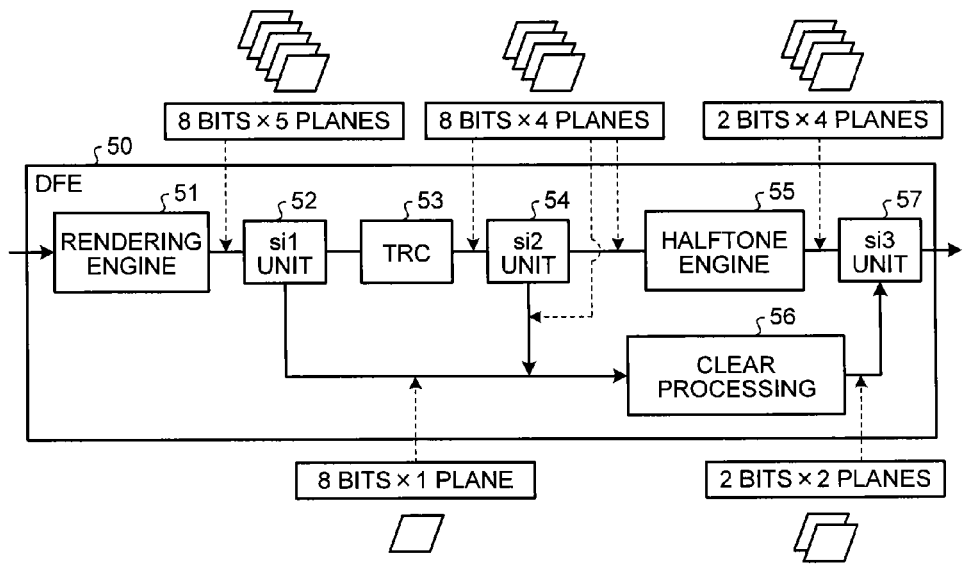
FIG. 20 is a figure illustrating an example of functional configuration of DFE.

Subsequently, the functional configuration of the DFE 50 will be explained. As illustrated in FIG. 20 as an example, the DFE 50 includes a rendering engine 51, an si1 unit 52, a TRC (Tone Reproduction Curve) 53, an si2 unit 54, a halftone engine 55, a clear processing 56, an si3 unit 57, and a surface effect selection table (not illustrated). The rendering engine 51, the si1 unit 52, the TRC (Tone Reproduction Curve) 53, the si2 unit 54, the halftone engine 55, the clear processing 56, and the si3 unit 57 are achieved when the control unit of the DFE 50 executes various kinds of programs stored in a main storage unit and an auxiliary storage unit. Any one of the si1 unit 52, the si2 unit 54, and the si3 unit 57 has a (separating) function to separate image data and (integrating) function to unite image data. The surface effect selection table is stored in, for example, the auxiliary storage unit.

Image data (for example, print data as illustrated in FIG. 13) transmitted from the host apparatus 10 are input into the rendering engine 51. The rendering engine 51 interprets the received image data as language, and converts the image data expressed in a vector format in a raster format, and converts color space expressed in an RGB format and the like into color space in an CMYK format, and outputs the image data of the clear toner plane including eight-bit image data for each of the CMYK color planes, the eight-bit image data of the gloss control plane, and the eight-bit image data of the clear plane. The si1 unit 52 outputs the eight-bit image data of each of CMYK to the TRC 53, and outputs the image data of the clear toner plane to the clear processing 56. In this case, the DFE 50 converts the image data of the gloss control plane in the vector format which is output from the host apparatus 10 into the raster format, and as a result, the DFE 50 outputs the image data of the gloss control plane in which the type of surface effect designated by the user with image processing application for the drawing object is set as the density value in units of pixels. Further, the DFE 50 converts the image data of the clear plane in the vector format which is output from the host apparatus 10 into the raster format, and as a result, the DFE 50 outputs the image data of the clear plane in which the drawing object is drawn with the density value in units of pixels.

The TRC 53 receives the eight-bit image data of each of the CMYK via the si1 unit 52. The TRC 53 performs gamma correction with a gamma curve of 1D_LUT generated by calibration on the image data received. An example of image processing includes not only the gamma correction but also total volume control of toner. The total volume control is processing to limit the eight-bit image data of each of CMYK having been subjected to the gamma correction because the amount of toner that can be placed by the printer machine 70 is limited for one pixel on the recording medium. When printing is performed beyond the total volume control, the image quality will be degraded because of transfer failure and fixing failure. In this embodiment, only related gamma correction will be picked up and explained.

The si2 unit 54 outputs the eight-bit image data of each of CMYK having been subjected to the gamma correction by the TRC 53 to the clear processing 56 as data to generate inverse mask (explained later). The halftone engine 55 receives the eight-bit image data of each of CMYK having been subjected to the gamma correction via the si2 unit 54. The halftone engine 55 performs, for example, halftone processing to convert the received image data into a data format of two-bit image data for each of CMYK so that the data are output to the printer machine 70, and outputs the two-bit image data of each of CMYK having been subjected to the halftone processing. The two bits are merely an example, and the number of bits is not limited thereto.

The clear processing 56 receives, via the sit unit 52, the eight-bit image data of the clear toner plane including the gloss control plane and the clear plane converted by the rendering engine 51, and receives, via the si2 unit 54, the eight-bit image data of the color plane of each of CMYK having been subjected to the gamma correction by the TRC 53. The clear processing 56 uses the image data of the gloss control plane of the received image data to look up the surface effect selection table explained later, and determines the surface effect for the density value (pixel value) representing each pixel constituting the image data of the gloss control plane, and in accordance with the determination, the ON/OFF state of the glosser 80 is determined. The clear processing 56 uses the eight-bit image data of the color plane of each of CMYK and the eight-bit image data of the clear toner plane which have been received, thereby generating, as necessary, an inverse mask and a solid mask, and generate, as necessary, two-bit image data in the raster format of the clear toner plane to attach the clear toner on the basis of the image data of the clear toner plane, the inverse mask, and the solid mask thus generated. Then, in accordance with the result of determination of the surface effect, the clear processing 56 generates and outputs, as necessary, the image data of the clear toner plane used by the printer machine 70 and the image data of the clear toner plane used by the low-temperature fixing machine 90, and further outputs ON/OFF information indicating the ON/OFF state of the glosser 80.

In this case, the inverse mask is provided to uniformize the total amount of attached clear toner and CMYK toners on each pixel constituting the region of the target where the surface effect is given. More specifically, in the image data of the CMYK color plane and the image data of the clear toner plane, all the density values representing the pixels constituting the region of the target are added, and the inverse mask is image data obtained by subtracting the added value thus obtained from a predetermined value. For example, the above inverse mask 1 is represented by the expression 1 below.

$$Clr=100-(C+M+Y+K) \quad (1)$$

however, when Clr<0 holds, Clr=0

In the expression 1, Clr, C, M, Y, K represents the density rate converted from the density value of each pixel for each of the C, M, Y, K toners and the clear toner. More specifically, with the expression 1, the total amount of attached toner obtained by adding the total amount of each of attached C, M, Y, K toners and the amount of attached clear toner is caused to be 100% for all the pixels constituting the region of the target to which the surface effect is given. When the total amount of each of the attached C, M, Y, K toners is 100% or more, no clear toner is attached, and the density rate thereof is caused to be 0%. This is because the portion where the total amount of each of the attached C, M, Y, K toners is 100% or more is smoothed by the fixing processing. As described above, the total amount of attached toners on all the pixels constituting the region of the target where the surface effect is given is caused to be 100% or more, whereby this eliminates the unevenness on the surface due to the difference in the total amount of attached toners in the region of the target, and as a result, and this causes gloss made by regular reflection of light. However, there are inverse masks that can be obtained from an expression other than the expression 1, and there may be multiple types of inverse masks.

For example, the inverse mask may uniformly attach the clear toner to each pixel. In this case, the inverse mask is also referred to as a solid mask, which will be expressed by the expression 2 below.

$$Clr=100 \quad (2)$$

Among the pixels of the target where the surface effect is given, there may be pixels associated with density rates other than 100%, and there may be multiple patterns of solid masks.

For example, the inverse mask may be obtained from multiplication of color texture exposure rate. In this case, the inverse mask is represented by the expression 3 below, for example.

$$Clr=100\times\{(100-C)/100\}\times\{(100-M)/100\}\times\{(100-Y)/100\}\times\{(100-K)/100\} \quad (3)$$

In the above expression 3, (100−C)/100 denotes texture exposure rate of C, and (100−M)/100 denotes a texture exposure rate of M, (100−Y)/100 denotes a texture exposure rate of Y, and (100−K)/100 denotes a texture exposure rate of K.

For example, the inverse mask may be obtained by a method where the smoothness is assumed to be determined by the halftone dot of the maximum area ratio. In this case, the inverse mask is represented by the expression 4 below, for example.

$$Clr=100-\max(C,M,Y,K) \qquad (4)$$

In the above expression 4, the max (C, M, Y, K) indicates that the density value of the color representing the maximum density value of CMYK is the representing value.

In short, the inverse mask may be represented by any one of the expressions 1 to 4 explained above.

Figure 21:
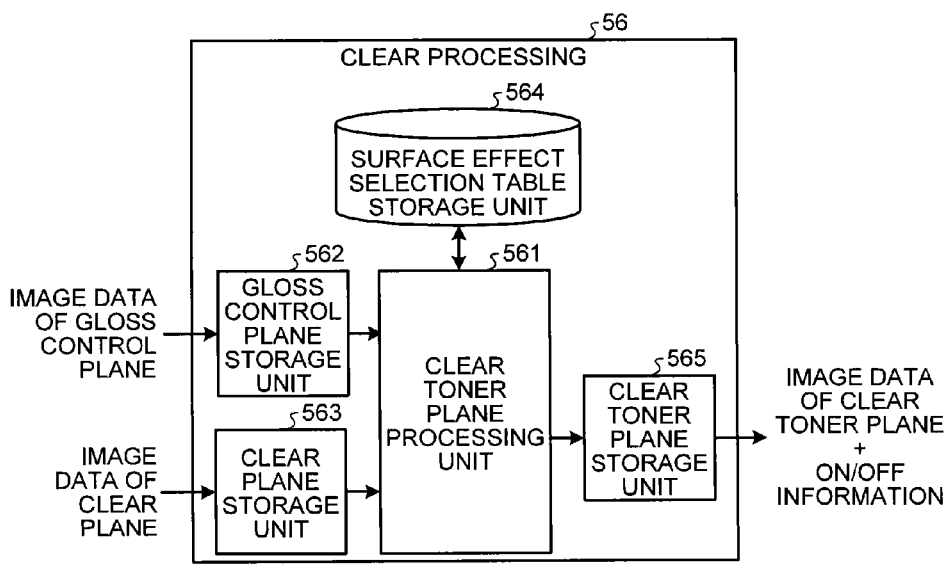
FIG. 21 is a figure illustrating an example of clear processing of FIG. 20.

FIG. 21 illustrates an example of clear processing 56 as illustrated in FIG. 20. As illustrated in FIG. 21, the clear processing 56 includes a clear toner plane processing unit 561, a gloss control plane storage unit 562, a clear plane storage unit 563, a surface effect selection table storage unit 564, and a clear toner plane storage unit 565. The surface effect selection table storage unit 564 stores a surface effect selection table explained with reference to FIG. 22 explained later. Among the image data of the clear toner plane received from the si1 unit 52, the image data of the optical control plane are temporarily stored in the gloss control plane storage unit 562. On the other hand, the image data of the clear plane is temporarily stored in the clear plane storage unit 563.

The clear processing 56 receives the eight-bit image data of the color plane of each of CMYK. The clear toner plane processing unit 561 uses the image data of the gloss control plane and the image data of the clear plane respectively stored in the gloss control plane storage unit 562 and the clear plane storage unit 563 and the received image data of the color plane to generate the inverse mask and the solid mask as necessary. The clear toner plane processing unit 561 generates, as necessary, two-bit image data in the raster format of the clear toner plane to attach the clear toner on the basis of the inverse mask and the solid mask thus generated and the image data of the clear toner plane. The image data of the clear toner plane are temporarily stored in the clear toner plane storage unit 565, and thereafter, the image data are output from the clear processing 56.

Further, among the received image data, the clear toner plane processing unit 561 uses the image data of the gloss control plane to look up the surface effect selection table explained later, and determines the surface effect corresponding to the density value (pixel value) represented by each pixel constituting the image data of the gloss control plane, and in accordance with the determination, determines the ON/OFF state of the glosser 80, and generates the ON/OFF information indicating the ON/OFF state of the glosser 80. The generated ON/OFF information as well as the image data of the clear toner plane are temporarily stored to the clear toner plane storage unit 565, and thereafter are output from the clear processing 56.

By executing the above processing, the clear processing 56 generates, as necessary, the image data of the clear toner plane used by the printer machine 70 and the image data of the clear toner plane used by the low-temperature fixing machine 90, and outputs them, in accordance with the result of determination of the surface effect, and further, outputs the ON/OFF information indicating the ON/OFF state of the glosser 80.

The surface effect selection table stored in the surface effect selection table storage unit 564 of FIG. 21 is a table indicating corresponding relationship between the type of surface effect and the density value serving as the gloss control value indicating the surface effect, and is a table indicating corresponding relationship of the above, control information concerning the post-processing machine in accordance with the configuration of the image forming system, the image data of the clear toner plane used by the printer machine 70, and the image data of the clear toner plane used by the post-processing machine. The configuration of the image forming system is different in various manners, but in the present embodiment, the glosser 80 and the low-temperature fixing machine 90 are connected to the printer machine 70 as the post-processing machine. Accordingly, the control information concerning the post-processing machine according to the configuration of the image forming system is the ON/OFF information indicating the ON/OFF state of the glosser 80. The image data of the clear toner plane used by the post-processing machine include the image data of the clear toner plane used by the low-temperature fixing machine 90. FIG. 22 is a figure illustrating an example of data configuration of surface effect selection table. For each of different configurations of image forming systems, the surface effect selection table may include corresponding relationship of control information about the post-processing machine, image data of the clear toner plane 1 used by the printer machine 70, image data of the clear toner plane 2 used by the post-processing machine, a density value, and the type of surface effect, but FIG. 22 illustrates an example of data configuration according to the configuration of the image forming system according to the present embodiment. In the corresponding relationship of the type of surface effect and density value as illustrated in the figure, various kinds of types of surface effects are associated for each range of density value. Various kinds of types of surface effects are associated in unit of 2% with respect to the rate of density (density rate) converted from a value representing the range of the density value (representing value). More specifically, the surface effect giving the gloss (mirror effect and solid effect) is associated with the range of the density value where the density rate is 84% or more ("212" to "255"), and the surface effect to suppress the gloss (matt and premium matt) is associated with the range of the density value where the density rate is 16% or less ("1" to "43"). Surface effects such as texture and background pattern watermark are associated with the range of density value where the density rate is 20% to 80%.

More specifically, for example, the premium gloss (PM: Premium Gross) is associated as surface effect with pixel values of "238" to "255", and among them, different types of premium gloss are respectively associated with three ranges, i.e., pixel value of "238" to "242", pixel value of "243" to "247", and pixel value of "248" to "255". The gloss (G: Gross) is associated with the pixel value of "212" to "232", and among them, different types of gloss are respectively associated with four ranges, i.e., pixel value of "212" to "216", pixel value of "217" to "221", pixel value of "222" to "227", and pixel value of "228" to "232". The matt (M: Matt) is associated with the pixel value of "23" to "43", and among them, different types of matt are respectively associated with four ranges, i.e., pixel value of "23" to "28", pixel value of "29" to "33", pixel value of "34" to "38", and pixel value of "39" to "43". The premium matt (PM: Premium Matt) is associated with the pixel value of "1" to "17", and among them, different types of premium matt are respectively associated with three ranges, i.e., pixel value of "1" to "7", pixel value of "8" to "12", and pixel value of "13" to "17". The different types of the same surface effect explained above are different in the expressions to obtain the image data of the clear toner plane used by the printer machine 70 and the low-temperature fixing machine 90, but the printer main body and the post-processing machine operate in the same manner. It should be noted that the association is made such that no surface effect is given to the density value "0".

FIG. 22 illustrates each of the contents of the ON/OFF information indicating the ON/OFF state of the glosser 80, the image data of the clear toner plane 1 used by the printer machine 70 (Clr-1 of FIG. 1), and the image data of the clear toner plane 2 used by the low-temperature fixing machine 90 in association with the pixel value and surface effect. For example, this indicates that, when the surface effect is premium gloss, the glosser 80 is turned on, and the image data of the clear toner plane 1 used by the printer machine 70 represents the inverse mask, and the image data of the clear toner plane 2 used by the low-temperature fixing machine 90 (Clr-2 of FIG. 1) is none of them. The inverse mask is obtained from, for example, the expression 1 explained above. The example illustrated in FIG. 22 is an example where the region where the mirror effect is designated as the surface effect corresponds to the entire region defined by the image data. A case where the region where the mirror effect is designated as the surface effect corresponds to a portion of the region defined by the image data will be explained later.

This indicates that, when the density value is "228" to "232" and the surface effect is the gloss, the glosser 80 is turned off, the image data of the clear toner plane 1 used by the printer machine 70 is the inverse mask 1, and the image data of the clear toner plane 2 used by the low-temperature fixing machine 90 is none of them.

The inverse mask 1 may be expressed by any one of the expressions 1 to 4 explained above. This is because since the glosser 80 is in OFF state, and accordingly, the total amount of attached toner which is to be smoothed is different, and therefore, the surface unevenness is increased by the premium gloss, and as a result, the gloss having low glossiness due to the premium gloss can be obtained. This indicates that, when the surface effect is the matt, the glosser 80 is turned off, the image data of the clear toner plane 1 used by the printer machine 70 is the halftone (halftone dot), and the image data of the clear toner plane 2 used by the low-temperature fixing machine 90 is none of them. This indicates that, when the surface effect is the matt, the glosser 80 may be either turned on or off, the image data of the clear toner plane 1 used by the printer machine 70 is none of them, and the image data of the clear toner plane 2 used by the low-temperature fixing machine 90 is the solid mask. The solid mask is, for example, obtained from the expression 2 explained above.

The clear processing 56 looks up the surface effect selection table explained above to determine the surface effect associated with each pixel value indicated by the gloss control plane, and determines the ON/OFF state of the glosser 80, thus determining what kind image data of the clear toner plane are used by the printer machine 70 and the low-temperature fixing machine 90. The clear processing 56 determines the ON/OFF state of the glosser 80 for each of the pages. Then, as described above, the clear processing 56 generates the image data of the clear toner plane as necessary in accordance with the result of determination and outputs the image data, and outputs the ON/OFF information for the glosser 80.

The si3 unit 57 unites the two-bit image data of each of CMYK having been subjected to the halftone processing and the two-bit image data of the clear toner plane generated by the clear processing 56, and outputs the united image data to the MIC 60. The clear processing 56 may not generate at least one of the image data of the clear toner plane used by the printer machine 70 and the image data of the clear toner plane used by the low-temperature fixing machine 90. Accordingly, one of the image data of the clear toner plane generated by the clear processing 56 are united by the si3 unit 57, and when both of the image data of the clear toner plane are not generated by the clear processing 56, the image data obtained by uniting the two-bit image data of each of CMYK are output from the si3 unit 57. As a result, four to six two-bit image data are output from the DFE 50 to the MIC 60. The si3 unit 57 also outputs the ON/OFF information for the glosser 80 which is output from the clear processing 56 to the MIC 60.

Figure 23:
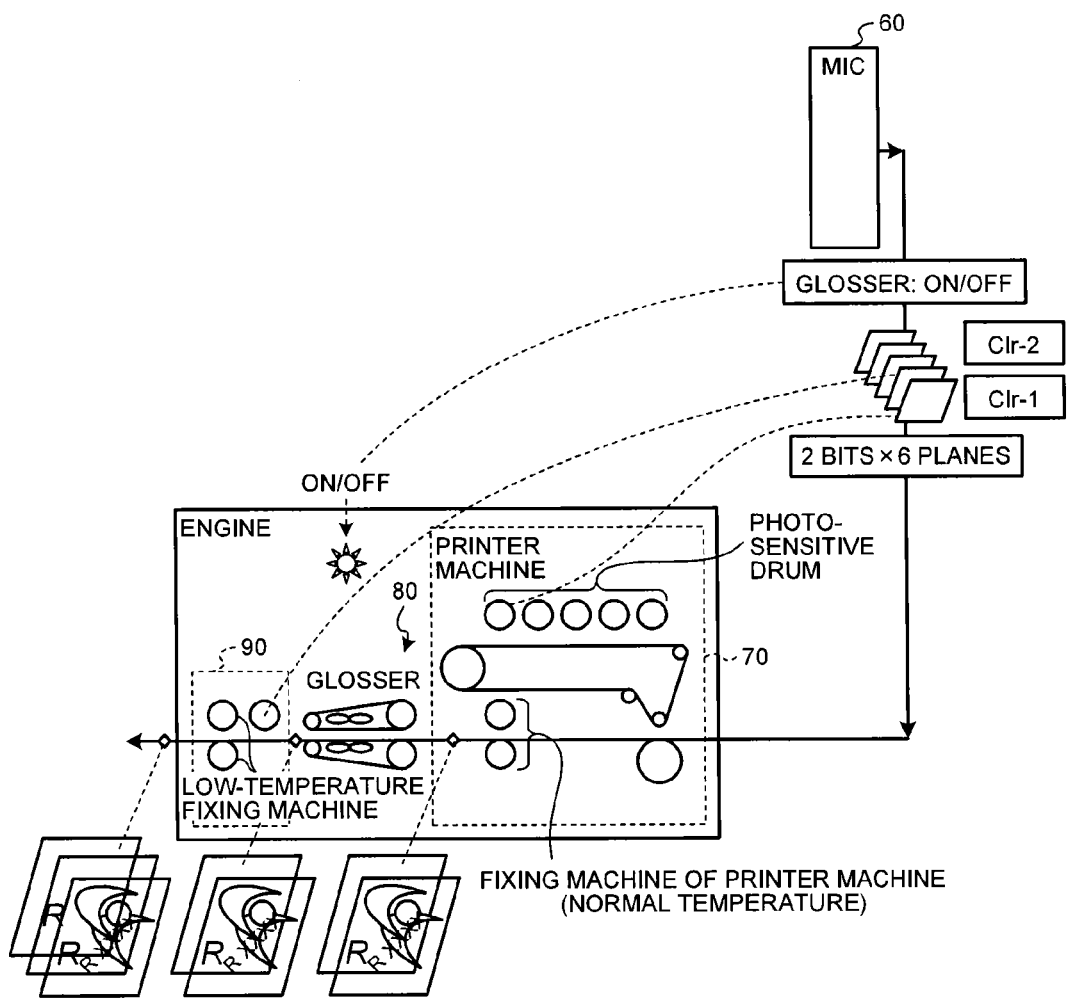
FIG. 23 is a figure schematically illustrating an example of configuration of MIC.

The MIC 60 in FIG. 1 is connected to the DFE 50 and the printer machine 70. The MIC 60 outputs the apparatus configuration information indicating the apparatus configuration provided as the post-processing machine to the DEF 50. The MIC 60 receives the image data of the color plane and the image data of the clear toner plane from the DFE 50, and allocates them to the apparatuses supporting the image data, and controls the post-processing machines. More specifically, as illustrated in FIG. 23 as an example, the MIC 60 outputs, to the printer machine 70, the image data of the CMYK color plane among the image data which are output from the DFE 50, and when the image data of the clear toner plane used by the printer machine 70 are included, the image data of the clear toner plane are also output to the printer machine 70, and using the ON/OFF information which is output from the DFE 50, the glosser 80 is turned on or off, and when the image data of the clear toner plane used by the low-temperature fixing machine 90 are included, the image data of the clear toner plane are output to the low-temperature fixing machine 90. The glosser 80 may switch a path in which fixing is performed and a path in which fixing is not performed in accordance with the ON/OFF information. The low-temperature fixing machine 90 may switch the ON/OFF state in accordance with presence/absence of the image data of the clear toner plane and may switch the paths in the same manner as the glosser 80.

As illustrated in FIG. 23, the print apparatus including the printer machine 70, the glosser 80, and the low-temperature fixing machine 90 includes a conveying path to convey a recording medium. More specifically, the printer machine 70 includes multiple photosensitive drums of electrophotography-method, a transfer belt to transfer a toner image formed on the photosensitive drum, a transfer apparatus to transfer a toner image on a transfer belt onto a recording medium, and a fixing machine to fix a toner image on a recording medium onto the recording medium. The recording medium is conveyed along a conveying path by a conveying member, not illustrated, so that it is conveyed through the positions where the printer machine 70, the glosser 80, and the low-temperature fixing machine 90 are provided, in this order. Then, these devices perform the processing in order, whereby an image is formed and surface effect is given, and thereafter, the recording medium is conveyed by a conveying mechanism, not illustrated, and discharged out of the print apparatus.

Subsequently, the procedure of gloss control processing performed by the image forming system according to the present embodiment will be explained with reference to FIG. 24. When the DFE 50 receives image data from the host apparatus 10 (step S1), the rendering engine 51 interprets the image data as language, and converts image data expressed in a vector format into a raster format, and converts the color space expressed in an RGB format into a color space of CMYK format, whereby eight-bit image data of CMYK color planes and eight-bit gloss control plane are obtained (step S2).

Figure 25:
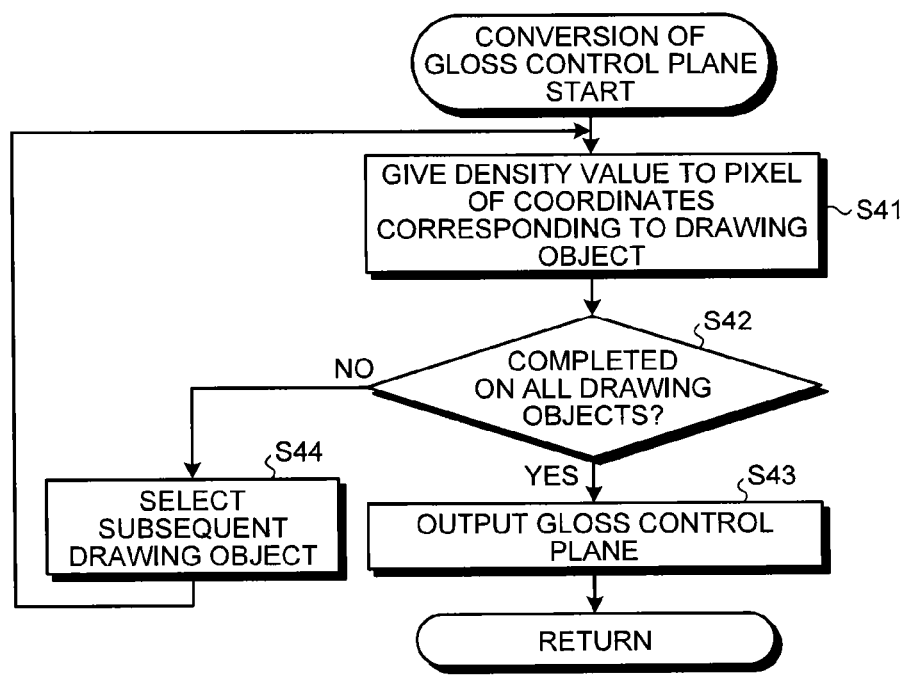
FIG. 25 is a flowchart illustrating procedure of conversion processing of image data of gloss control plane.

Hereinafter, the details of conversion processing of the image data of the gloss control plane in step 2 will be explained. FIG. 25 is a flowchart illustrating procedure of conversion processing of image data of gloss control plane. In this conversion processing, the image data of the gloss control plane of FIG. 4, i.e., the image data of the gloss control plane designating the density value to identify the surface effect for each drawing object as illustrated in FIG. 16 are converted into the image data of the gloss control plane designating the density value for each pixel constituting the drawing object.

The rendering engine 51 gives the density values set for the drawing object to pixels in the range of coordinates corresponding to the drawing object of the gloss control plane as illustrated in FIG. 16 (step S41), whereby the image data of the gloss control plane are converted. Then, a determination is made as to whether such processing has been performed on all the drawing objects existing in the image data of the gloss control plane (step S42).

Then, when the processing has not yet been performed (step S42; No), the rendering engine 51 selects a subsequent drawing object that has not yet been processed from among the image data of the gloss control plane (step S44), and repeats the processing of step S41.

On the other hand, whether the processing of step S41 is determined to have been performed on all the drawing objects existing in the image data of the gloss control plane in step S42 (step S42; Yes), the converted image data of the gloss control plane are output (step S43). With the above processing, the image data of the gloss control plane are converted into data in which the surface effect is set for each pixel.

Figure 24:
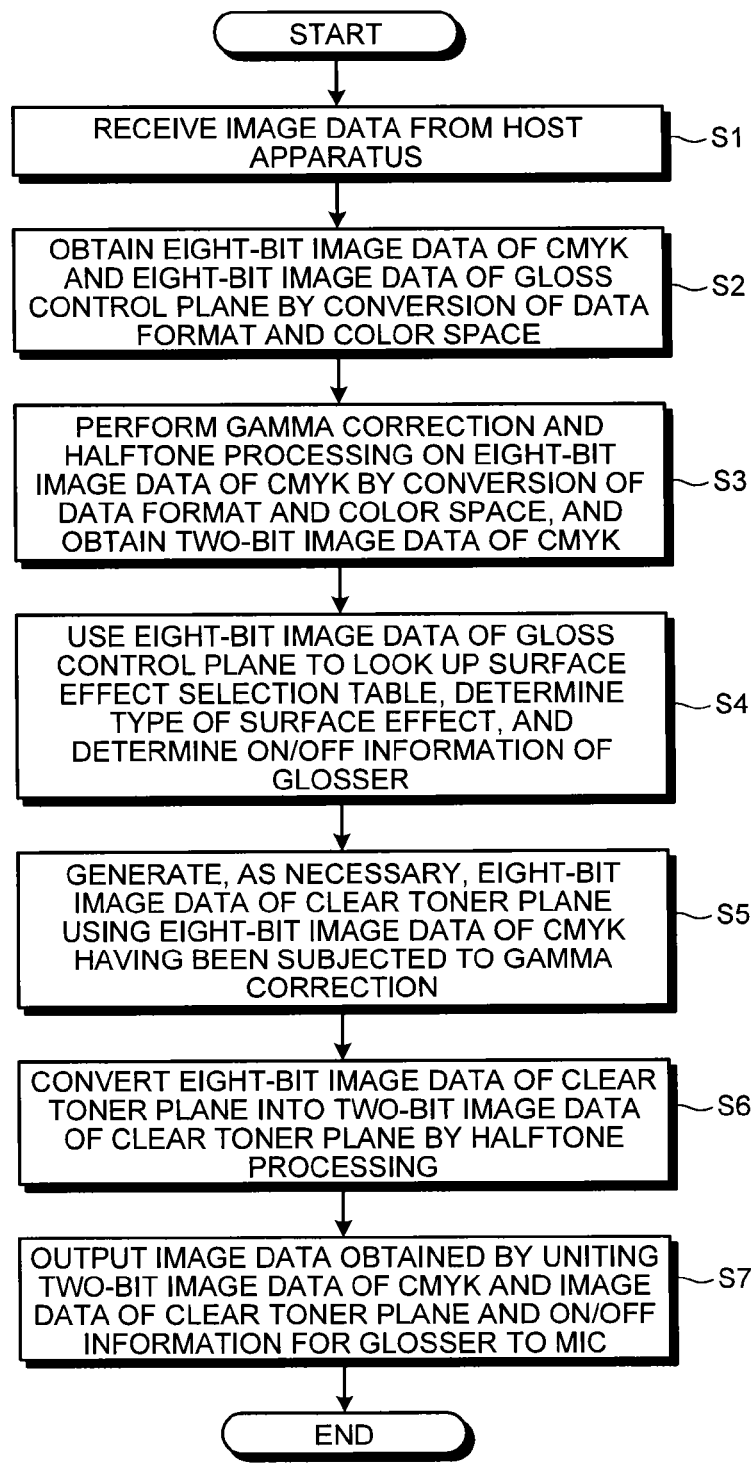
FIG. 24 is a flowchart illustrating procedure of gloss control processing performed by an image forming system.

Back to FIG. 24, when the eight-bit image data of the gloss control plane are output, the TRC 53 of the DFE 50 performs gamma correction with a gamma curve of 1D_LUT generated by calibration on the eight-bit image data of each of CMYK color planes, and the halftone engine 55 performs the halftone processing on the image data having been subjected to the gamma correction to convert the image data into a data format of two-bit image data of each of CMYK for output to the printer machine 70, and thus, the two-bit image data of each of CMYK having been subjected to the halftone processing are obtained (step S3).

The clear processing 56 of the DFE 50 uses the eight-bit gloss control plane to look up the surface effect selection table, and determines the surface effect designated for each pixel value indicated by the gloss control plane. Then, the clear processing 56 makes such determination with regard to all the pixels constituting the gloss control plane. In the gloss control plane, all the pixels constituting each of the regions where surface effect is given are basically represented by density values in the same range. Accordingly, the clear processing 56 determines that pixels in proximity that are determined to be the same surface effect are included in the region where the same surface effect is given. As described above, the clear processing 56 determines the region where surface effect is given and the type of surface effect given to the region. Then, in accordance with the determination, the clear processing 56 determines the ON/OFF state of the glosser 80 (step S4).

Subsequently, the clear processing 56 of the DFE 50 uses, as necessary, the eight-bit image data of each of CMYK having been subjected to the gamma correction to generate, as necessary, the eight-bit image data of the clear toner plane to attach the clear toner (step S5). Then, the halftone engine 56 converts, by the halftone processing, the eight-bit image data of the clear toner plane using the eight-bit image data into the two-bit image data of the clear toner plane (step S6).

Subsequently, the Si3 unit 57 of the DFE 50 unites the two-bit image data of each of CMYK having been subjected to the halftone processing obtained in step S3 and the two-bit image data of the clear toner plane generated in step S6, and outputs the united image data and the ON/OFF information indicating the ON/OFF state of the glosser 80 determined in step S4 to the MIC 60 (step S7).

When the clear processing 56 does not generate the image data of the clear toner plane in step S5, only the two-bit image data of each of CMYK having been subjected to the halftone processing obtained in step S3 are united and output to the MIC 60 in step S7.

Hereinafter, specific example according to the type of surface effect will be explained. In this case, various kinds of premium gloss PG and gloss G to give gloss and the matt M and the premium matt PM to suppress the gloss will be explained more specifically. In this explanation, the same type of surface effect is designated in one page. In step S4, the clear processing 56 of the DFE 50 uses the density value represented by each pixel of the eight-bit gloss control plane to look up the surface effect selection table as illustrated in FIG. 22 as an example, and determines that the surface effect designated for pixels having density values of "238" to "255" is the premium gloss PG. In this case, further, the clear processing 56 of the DFE 50 determines whether the region where the premium gloss PG is designated as the surface effect corresponds to the entire region defined by the image data. When the determination result is positive, for example, the clear processing 56 of the DFE 50 generates an inverse mask from the expression 1, using the image data corresponding to the region in the eight-bit image data of each of CMYK having been subjected to the gamma correction. What represents the inverse mask is the image data of the clear toner plane used by the printer machine 70. The low-temperature fixing machine 90 does not use the image data of the clear toner plane for the region, and therefore, the DFE 50 does not generate the image data of the clear toner plane used by the low-temperature fixing machine 90. Then, in step S7, the si3 unit 57 of the DFE 50 unites the image data of the clear toner plane used by the printer machine 70 and the two-bit image data of each of CMYK having been subjected to the halftone processing obtained in step S3, and outputs the united image data and the ON/OFF information indicating the ON state of the glosser 80 to the MIC 60. The MIC 60 outputs the image data of the clear toner plane used by the printer machine 70 and the image data of the CMYK color planes which are image data which are output from the DFE 50 to the printer machine 70, and uses the ON/OFF information which is output from the DFE 50 to turn on the glosser 80. The printer machine 70 uses the image data of the clear toner plane and the image data of the CMYK color planes which are output from the MIC 60 to emit light beam from the exposing unit, and forms a toner image corresponding to each toner onto the photosensitive element, transfers this onto a sheet, and fixes this with heat and pressure applied at a normal temperature. Thus, not only the CMYK toners but also the clear toner are attached to the sheet, whereby the image is formed. Thereafter, the glosser 80 pressurizes the sheet at a high temperature and with a high pressure. The image data of the clear toner plane are not output to the low-temperature fixing machine 90, and therefore, the low-temperature fixing machine 90 does not attach the clear toner, and the sheet is discharged. As a result, the total amount of attached toner of each of the CMYK and clear toner is uniformly compressed in the entire region defined by the image data, and therefore, high degree of gloss can be obtained from the surface of the region.

On the other hand, when the region in which the premium gloss PG is designated as the surface effect corresponds to a portion of the region defined by the image data, the following situation occurs. First, the image data of the clear toner plane representing the inverse mask is used for the region where the premium gloss PG is designated. However, when the total value of the attached CMYK toners is set at a predetermined value or more for all the pixels other than them, the total amount of toners becomes as follows. When pressurized with the glosser 80, as a result, the total amount of the attached clear toner and CMYK toners in the region where the total value of the attached CMYK toners is set at a predetermined value or more and the region where the premium gloss PG is designated become the same.

For example, the total value of the attached CMYK toners for all the pixels constituting the region defined by the image data is set at a predetermined value or more, the same result as the designation of the premium gloss PG is obtained in the entire region defined by the image data.

For this reason, when the region where the premium gloss PG is designated as the surface effect corresponds to a portion of the region defined by the image data, the DFE 50 generates the image data of the same clear toner plane as the one designated with the premium gloss PG for the entire region defined by the image data, and after the clear toner is attached to the sheet, the sheet is pressurized by the glosser 80. Subsequently, the image data of the clear toner plane used by the low-temperature fixing machine 90 are generated so that the surface effect of the premium matt PM is given to the region other than the region where the mirror effect PG is designated as the surface effect for the sheet pressurized by the glosser 80.

More specifically, the DFE 50 generates the inverse mask based on the expression 1 in the same manner as what has been described above, as the image data of the clear toner plane used by the printer machine 70. Further, the DFE 50 generates the solid mask based on the expression 2 for the region other than the region where the mirror effect PG is designated as the surface effect, as the image data of the clear toner plane used by the low-temperature fixing machine 90. Then, in step S7, the si3 unit 57 of the DFE 50 unites the image data of the clear toner plane used by the printer machine 70, the image data of the clear toner plane used by the low-temperature fixing machine 90, and the two-bit image data of each of CMYK having been subjected to the halftone processing obtained in step S3, and outputs the united image data and the ON/OFF information indicating the ON state of the glosser 80 to the MIC 60.

The MIC 60 outputs the image data of the CMYK color planes and the image data of the clear toner plane used by the printer machine 70 among the image data which are output from the DFE 50 to the printer machine 70, and uses the ON/OFF information which is output from the DFE 50 to turn on the glosser 80, and outputs the image data of the clear toner plane used by the low-temperature fixing machine 90 among the image data which are output from the DFE 50 to the low-temperature fixing machine 90. The printer machine 70 uses the image data of the CMYK color planes and the image data of the clear toner plane which are output from the MIC 60 to form an image obtained by attaching the CMYK toners and the clear toner onto the sheet. Thereafter, the glosser 80 pressurizes the sheet at a high temperature and with a high pressure. The low-temperature fixing machine 90 forms the toner image based on the clear toner using the image data of the clear toner plane which are output from the MIC 60, overlays the toner image onto the sheet having passed through the glosser 80, and fixes the toner image onto the sheet with heat and pressure applied at a low temperature. As a result, in the region where the premium gloss PG is designated, the total amount of the attached CMYK toners and clear toner is pressurized uniformly, and therefore, high degree of gloss can be obtained from the surface of the region. On the other hand, other than the region where the premium gloss PG is designated, the surface becomes uneven due to the attached clear toner with the solid mask after the pressurizing of the glosser 80, and the gloss of the surface in the region is suppressed.

In step S4, the clear processing 56 of the DFE 50 uses the density value represented by each pixel of the eight-bit gloss control plane to look up the surface effect selection table, and determines that the surface effect designated for pixels having density values of "212" to "232" is the gloss G, and in particular, determines that the surface effect designated for pixels having density values of "228" to "232" is the gloss type 1. In this case, the clear processing 56 of the DFE 50 uses the image data corresponding to the region in the eight-bit image data of each of CMYK having been subjected to the gamma correction to generate the inverse mask 1. What represents the inverse mask 1 is the image data of the clear toner plane used by the printer machine 70. The low-temperature fixing machine 90 does not use the image data of the clear toner plane for the region, and therefore, the DFE 50 does not generate the image data of the clear toner plane used by the low-temperature fixing machine 90. Then, in step S7, the si3 unit 57 of the DFE 50 unites the image data of the clear toner plane used by the printer machine 70 and the two-bit image data of each of CMYK having been subjected to the halftone processing obtained in step S3, and outputs the united image data and the ON/OFF information indicating the OFF state of the glosser 80 to the MIC 60. The MIC 60 outputs the image data of the clear toner plane used by the printer machine 70 and the image data of the CMYK color planes which are image data which are output from the DFE 50 to the printer machine 70, and uses the ON/OFF information which is output from the DFE 50 to turn off the glosser 80. The printer machine 70 uses the image data of the CMYK color planes and the image data of the clear toner plane used by the printer machine 70 which are output from the MIC 60 to form an image obtained by attaching the CMYK toners and the clear toner onto the sheet. The glosser 80 is turned off, and therefore, the sheet is not thereafter pressurized at the high temperature and high pressure. The image data of the clear toner plane are not output to the low-temperature fixing machine 90, and therefore, the low-temperature fixing machine 90 does not attach the clear toner, and the sheet is discharged. As a result, in the region where the gloss G is designated as the surface effect, the total amount of the attached CMYK toners and clear toner become relatively uniform, and somewhat high intensity gloss can be obtained from the surface of the region.

In step S4, the clear processing 56 of the DFE 50 uses the density value represented by each pixel of the eight-bit gloss control plane to look up the surface effect selection table, and determines that the surface effect designated for pixels having density values of "23" to "43" is the matt M. In this case, the clear processing 56 of the DFE 50 generates the image data representing the halftone as the image data of the clear toner plane used by the printer machine 70. The low-temperature fixing machine 90 does not use the image data of the clear toner plane for the region, and therefore, the DFE 50 does not generate the image data of the clear toner plane used by the low-temperature fixing machine 90. Then, in step S7, the si3 unit 57 of the DFE 50 unites the image data of the clear toner plane used by the printer machine 70 and the two-bit image data of each of CMYK having been subjected to the halftone processing obtained in step S3, and outputs the united image data and the ON/OFF information indicating the ON state of the glosser 80 to the MIC 60. The MIC 60 outputs the image data of the clear toner plane used by the printer machine 70 and the image data of the CMYK color planes which are image data which are output from the DFE 50 to the printer machine 70, and uses the ON/OFF information which is output from the DFE 50 to turn off the glosser 80. The printer machine 70 uses the image data of the CMYK color planes and the image data of the clear toner plane which are output from the MIC 60 to form an image obtained by attaching the CMYK toners and the clear toner onto the sheet. The glosser 80 is turned off, and therefore, the sheet is not thereafter pressurized at the high temperature and high pressure. The image data of the clear toner plane are not output to the low-temperature fixing machine 90, and therefore, the low-temperature fixing machine 90 does not attach the clear toner, and the sheet is discharged. As a result, in the region where the matt M is designated as the surface effect, the surface becomes uneven due to the attached halftone dots with the clear toner, and the gloss of the surface of the region is somewhat suppressed.

In step S4, the clear processing 56 of the DFE 50 uses the density value represented by each pixel of the eight-bit gloss control plane to look up the surface effect selection table, and determines that the surface effect designated for pixels having density values of "1" to "17" is the premium matt PM. In this case, when another surface effect is designated within a page (explained later), the ON/OFF state of the glosser 80 is in accordance therewith, and in any of the ON state or OFF state, the clear processing 56 of the DFE 50 does not generate the image data of the clear toner plane used by the printer machine 70, and generates the solid mask as the image data of the clear toner plane used by the low-temperature fixing machine 90. Then, in step S7, the si3 unit 57 of the DFE 50 unites the image data of the clear toner plane used by the low-temperature fixing machine 90 and the two-bit image data of each of CMYK having been subjected to the halftone processing obtained in step S3, and outputs the united image data and the ON/OFF information indicating the ON/OFF state of the glosser 80 to the MIC 60. The MIC 60 outputs the image data of the CMYK color planes among the image data which are output from the DFE 50 to the printer machine 70, and outputs the image data of the clear toner plane used by the low-temperature fixing machine 90 among the image data which are output from the DFE 50 to the low-temperature fixing machine 90. The printer machine 70 uses the image data of the CMYK color planes which are output from the MIC 60 to form an image obtained by attaching the CMYK toners onto the sheet. When the glosser 80 is turned on, the sheet is pressurized by the glosser 80 at a high temperature and with a high pressure, and when the glosser 80 is turned off, the sheet is not pressurized at a high temperature and with a high pressure. The low-temperature fixing machine 90 forms the toner image based on the clear toner using the image data of the clear toner plane which are output from the MIC 60, overlays the toner image onto the sheet having passed through the glosser 80, and fixes the toner image onto the sheet with heat and pressure applied at a low temperature. As a result, in the region where the premium matt PM is designated as the surface effect, the surface becomes uneven due to the attached clear toner with the solid mask, and the gloss of the surface in the region is suppressed.

In the above explanation, the same surface effect is designated in a page, but a case where different types of surface effects are designated in a page can also be achieved in the same manner using the above processing. More specifically, when multiple surface effects are designated in one page, the image data of the gloss control plane is configured such that a density value corresponding to the type of surface effect as illustrated in FIG. 22 is set for a pixel in the region where various kinds of surface effects are given. More specifically, in the gloss control plane, the region to give the surface effect is designated for each type of surface effect, and accordingly, the DFE 50 may determine that the range of pixel set with the same density value is the region where the same surface effect is given within the image data of the gloss control plane, and each surface effect can be easily achieved within one page.

However, when multiple types of surface effects are designated for one page by density values in the image data of the gloss control plane, the ON/OFF state of the glosser 80 cannot be switched in the same page, and therefore, there are not only a type of surface effect that can be achieved at the same time and but also a type of surface effect that cannot be achieved at the same time.

As illustrated in FIG. 1, in the present embodiment employing the configuration having the printer machine 70, the glosser 80, and the low-temperature fixing machine 90, when the surface effects of the premium gloss PG and the premium matt PM are designated in one page, the glosser 80 is turned on for the premium gloss PG and the ON/OFF state of the glosser 80 for the premium matt PM is in accordance with other surface effects within the page, which can be understood from FIG. 22, and accordingly, these two types of surface effects can be achieved at the same time within the page.

In this case, in step S4, the clear processing 56 of the DFE 50 uses the density value represented by each pixel of the eight-bit gloss control plane to look up the surface effect selection table as illustrated in FIG. 22 as an example, and determines that the surface effect designated for a region of pixels having density values of "238" to "255" is the premium gloss PG. Then, for example, the clear processing 56 of the DFE 50 generates an inverse mask from, for example, the expression 1, using the image data corresponding to the region in the eight-bit image data of each of CMYK having been subjected to the gamma correction. What represents the inverse mask is the image data of the clear toner plane used by the printer machine 70 for the region where the surface effect of the premium gloss PG is designated. The image data of the clear toner plane is not used by the low-temperature fixing machine 90 for the region where the premium gloss PG is designated, and therefore, the DFE 50 does not generate the image data of the clear toner plane used by the low-temperature fixing machine 90 for the region where the premium gloss PG is designated.

In step S4, likewise, in the same page as the above, the clear processing 56 of the DFE 50 looks up the surface effect selection table, and determines that the surface effect designated for a region of pixels having density values of "1" to "17" is the premium matt PM. In this case, the clear processing 56 of the DFE 50 turns on the glosser 80 in accordance with the setting of the premium gloss PG which is another surface effect within a page, and the clear processing 56 of the DFE 50 does not generate the image data of the clear toner plane used by the printer machine 70 for the region where the premium matt PM is designated, and generates the solid mask for the region where the premium matt PM is designated as the image data of the clear toner plane used by the low-temperature fixing machine 90.

Then, in step S7, the si3 unit 57 of the DFE 50 unites the image data of the clear toner plane used by the printer machine 70 for the region where the premium gloss PG is designated, the image data of the clear toner plane used by the low-temperature fixing machine 90 for the region where the premium matt PM is designated, and the two-bit image data of each of CMYK having been subjected to the halftone processing obtained in step S3, and outputs the united image data and the ON/OFF information indicating the ON state of the glosser 80 to the MIC 60.

The MIC 60 outputs, to the printer machine 70, the image data of the CMYK color planes among the image data which are output from the DFE 50 and the image data of the clear toner plane for the region where the premium gloss PG is designated which is used by the printer machine 70. The MIC 60 outputs, to the low-temperature fixing machine 90, the image data of the clear toner plane used by the low-temperature fixing machine 90 for the region where the premium matt PM is designated among the image data which are output from the DFE 50, and uses the ON/OFF information which is output from the DFE 50 to turn on the glosser 80.

The printer machine 70 uses the image data of the clear toner plane for the region where the premium gloss PG is designated and the image data of the CMYK color planes which are output from the MIC 60 to emit light beam from the exposing unit, and forms a toner image corresponding to each toner onto the photosensitive element, transfers this onto a sheet, and fixes this with heat and pressure applied at a normal temperature. Thus, not only the CMYK toners but also the clear toner are attached to the sheet, whereby the image is formed. Thereafter, the glosser 80 pressurizes the sheet at a high temperature and with a high pressure.

The low-temperature fixing machine 90 forms the toner image based on the clear toner using the image data of the clear toner plane for the region where the premium matt PM is designated which are output from the MIC 60, overlays the toner image onto the sheet having passed through the glosser 80, and fixes the toner image onto the sheet with heat and pressure applied at a low temperature. As a result, high degree of gloss can be obtained from the surface of the region where the premium gloss PG is designated as the surface effect, and the surface of the region where the premium matt PM is designated as the surface effect becomes uneven due to the attached clear toner with the solid mask, and the gloss of the surface in the region is suppressed.

Other than the above, when the surface effects of the gloss G, the matt M, and the premium matt PM are designated within a page in the configuration of the present embodiment, the glosser 80 is turned off for the gloss G and the matt M as can be seen from FIG. 22, and the ON/OFF state of the glosser 80 for the premium matt PM is in accordance with the designation of other surface effects within a page, and therefore, these three types of surface effects can be achieved at the same time within the page.

This will be explained in more details. In step S4, the clear processing 56 of the DFE 50 uses the density value represented by each pixel of the eight-bit gloss control plane to look up the surface effect selection table, and determines that the surface effect designated for a region of pixels having density values of "212" to "232" is the gloss G, and in particular, determines that the surface effect designated for pixels having density values of "228" to "232" is the gloss type 1. In this case, the clear processing 56 of the DFE 50 uses the image data corresponding to the region in the eight-bit image data of each of CMYK having been subjected to the gamma correction to generate the inverse mask 1. What represents the inverse mask 1 is the image data of the clear toner plane used by the printer machine 70 for the region where the gloss G is designated. The low-temperature fixing machine 90 does not use the image data of the clear toner plane for the region where the gloss G is designated, and therefore, the DFE 50 does not generate the image data of the clear toner plane used by the low-temperature fixing machine 90.

In step S4, likewise, in the same page as the above, the clear processing 56 of the DFE 50 looks up the surface effect selection table, and determines that the surface effect designated for a region of pixels having density values of "23" to "43" is the matt M. In this case, the clear processing 56 of the DFE 50 generates the image data representing the halftone as the image data of the clear toner plane used by the printer machine 70 for the region where the matt M is designated. The low-temperature fixing machine 90 does not use the image data of the clear toner plane for the region where the matt M is designated, and therefore, the DFE 50 does not generate the image data of the clear toner plane used by the low-temperature fixing machine 90.

In step S4, likewise, in the same page as the above, the clear processing 56 of the DFE 50 looks up the surface effect selection table, and determines that the surface effect designated for a region of pixels having density values of "1" to "17" is the premium matt PM. In this case, with regard to the ON/OFF state of the glosser 80, the clear processing 56 of the DFE 50 turns off the glosser 80 in accordance with the setting of the gloss G and the matt M which are other surface effects designated within a page, and the clear processing 56 of the DFE 50 does not generate the image data of the clear toner plane used by the printer machine 70 for the region where the premium matt PM is designated, and generates the solid mask for the region where the premium matt PM is designated as the image data of the clear toner plane used by the low-temperature fixing machine 90.

Then, in step S7, the si3 unit 57 of the DFE 50 unites the image data of the clear toner plane used by the printer machine 70 for the region where the gloss G is designated, the image data of the clear toner plane used by the printer machine 70 for the region where the matt M is designated, the image data of the clear toner plane used by the low-temperature fixing machine 90 for the region where the premium matt PM is designated, and the two-bit image data of each of CMYK having been subjected to the halftone processing obtained in step S3, and outputs the united image data and the ON/OFF information indicating the ON state of the glosser 80 to the MIC 60.

The MIC 60 outputs, to the printer machine 70, the image data of the CMYK color planes, the image data of the clear toner plane used by the printer machine 70 for the region where the gloss G is designated, and the image data of the clear toner plane used by the printer machine 70 for the region where the matt M is designated, which are the image data which are output from the DFE 50, and uses the ON/OFF information which is output from the DFE 50 to turn off the glosser 80. The MIC 60 outputs, to the low-temperature fixing machine 90, the image data of the clear toner plane used by the low-temperature fixing machine 90 for the region where the premium matt PM is designated among the image data which are output from the DFE 50.

The printer machine 70 uses the image data of the CMYK color planes, the image data of the clear toner plane used by the printer machine 70 for the region where the gloss is designated, and the image data of the clear toner plane used by the printer machine 70 for the region where the matt M is designated, which are output from the MIC 60 to form an image obtained by attaching the CMYK toners and the clear toner onto the sheet. The glosser 80 is turned off, and therefore, the sheet is not thereafter pressurized at the high temperature and high pressure.

The low-temperature fixing machine 90 uses the image data of the clear toner plane for the region where the premium matt PM is designated which are output from the MIC 60 to form the toner image based on the clear toner for the region of the premium matt PM, overlays the toner image onto the sheet, and fixes the toner image onto the sheet with heat and pressure applied at a low temperature.

As a result, in the region where the gloss G is designated as the surface effect within a page, the total amount of attached CMYK toners and clear toner become relatively uniform, and somewhat high intensity gloss can be obtained from the surface of the region. In the region where the matt M is designated as the surface effect within a page, the surface becomes uneven due to the attached halftone dots with the clear toner, and the gloss of the surface of the region is somewhat suppressed. Further, in the region where the premium matt PM is designated as the surface effect within a page, the surface becomes uneven due to the attached clear toner with the solid mask, and the gloss of the surface in the region is suppressed.

As described above, when multiple different types of surface effects are designated within the same page, and it is not necessary to switch the ON/OFF state of the glosser 80 in accordance with the surface effect, multiple different types of surface effects can be achieved within a page, but multiple different types of surface effects for which it is necessary to switch the ON/OFF state of the glosser 80 in the same page cannot be achieved within a page.

For example, when the premium gloss PG and the gloss G are designated within a page in the present embodiment which employs the configuration including the printer machine 70, the glosser 80, and the low-temperature fixing machine 90, the glosser 80 is turned on for the premium gloss PG and the glosser 80 is turned off for the gloss G as can be seen in FIG. 22, and therefore, two types of surface effects, i.e., the premium gloss PG and the gloss G cannot be achieved in a page.

As described above, different types of surface effects are designated in one page, but when they cannot be achieved in one page, the DFE 50 achieves some types of surface effects which cannot be achieved at the same time using surface effects other than the designated surface effects in the present embodiment.

Figure 26:
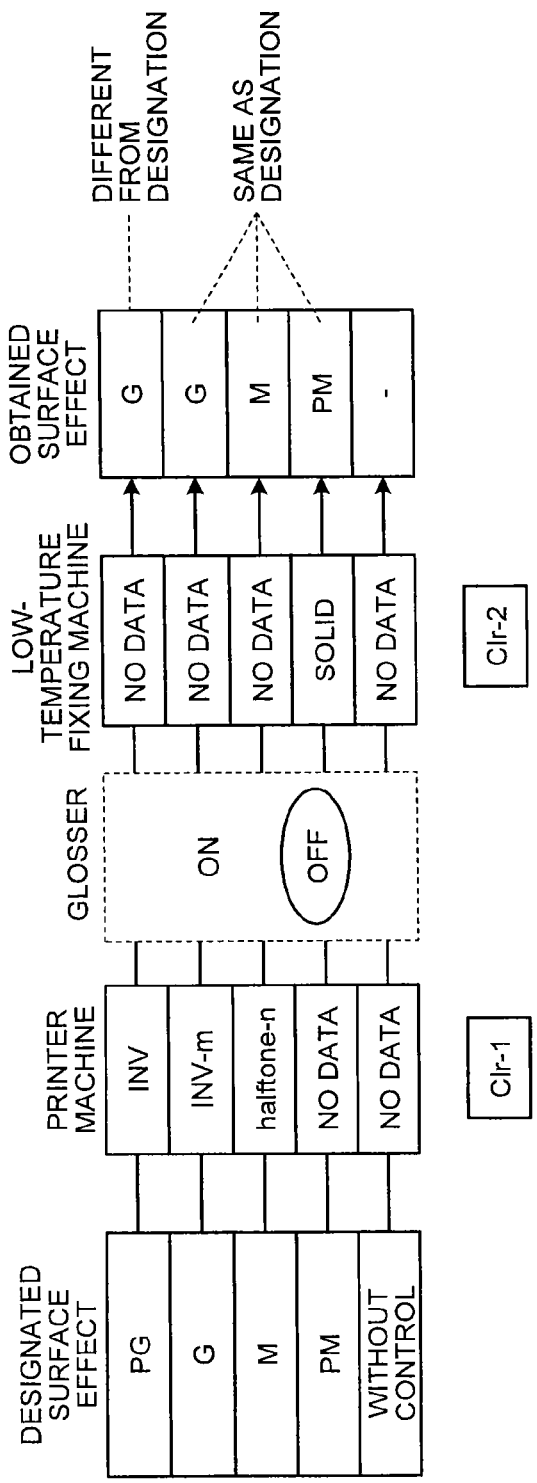
FIG. 26 is a figure illustrating comparison between the type of surface effect designated, image data of clear toner plane used by a printer machine, image data of clear toner plane used by a low-temperature fixing machine, and a surface effect actually used.

For example, as illustrated in FIG. 26 as an example, when four effects, i.e., the premium gloss PG, the gloss G, the matt M, and the premium matt PM, are designated in the same page, the DFE 50 turns off the glosser 80, and in accordance with the density value of the gloss control plane, each surface effect is achieved in the region where the surface effect is determined to be the gloss G, the region where the surface effect is determined to be the matt M, and the region where the surface effect is determined to be the premium matt PM, and the solid gloss G is selected as an alternative surface effect in the region where the surface effect is determined to be the premium gloss PG. Then, like the case of the gloss G, the DFE 50 uses the image data corresponding to the region in the eight-bit image data of each of CMYK having been subjected to the gamma correction for the region where the surface effect is determined to be the premium gloss PG to generate any one of the inverse masks A, B, C as the image data of the clear toner plane used by the printer machine 70 (corresponding to INV of FIG. 26). The image data of the clear toner plane used by the low-temperature fixing machine 90 are not generated. In FIG. 22, when the density value is "248" to "255", the effect is determined by the DFE 50 to be the premium gloss type A, and the inverse mask A is used. INV-m of FIG. 26 corresponds to the inverse masks 1 to 4 of FIG. 22, and halftone-n of FIG. 26 corresponds to halftones 1 to 4 of FIG. 22. As described above, on the sheet having been discharged by way of the printer machine 70, the glosser 80 in the OFF state, and the low-temperature fixing machine 90, the surface effect serving as the gloss G is given to the region where the premium gloss PG is designated and the region where the gloss G is designated, and the surface effect serving as the matt M is given to the region where the matt M is designated, and the surface effect serving the premium matt PM is given to the region where the premium matt PM is designated. None of the surface effects is given to the region which is not designated as the region where surface effect is given.

As described above, the DFE 50 uses the gloss control plane in which the density values are set in accordance with the type of surface effect designated by the user, and determines absence/presence of the post-processing with the post-processing machine in accordance with absence/presence and the type of the post-processing machine such as the glosser 80 and the low-temperature fixing machine 90 connected subsequent to the printer machine 70, and generates the image data of the clear toner plane to attach the clear toner as necessary. Therefore, even in image forming systems having various configurations, the image data of the clear toner plane to give the same surface effect can be generated, and using the image data of the clear toner plane, the clear toner is attached to the image formed by the CMYK toner images, whereby various kinds of surface effects can be given. Therefore, the user can give desired surface effect with the clear toner onto a print material on which an image is formed while the user is saved from trouble.

In the present embodiment, a density value to identify a surface effect is set for each pixel of the image data of the gloss control plane, and therefore, multiple types of surface effects can be given in one page of sheet.

Second Embodiment

The above first embodiment is configured so as to execute, within the host apparatus 10, processing to cause the surface effect of the adjacent area which is adjacent to the plus designation area to be changed to the surface effect different from the surface effect of the plus designation area. However, the embodiment is not limited thereto. For example, in the DFE 50, the surface effect of the adjacent area adjacent to the plus designation area may be changed to a surface effect different from the surface effect of the plus designation area. Alternatively, within the DFE 50, an adjacent area enclosing the plus designation area is generated, and the surface effect different from the surface effect of the plus designation area may be given to this adjacent area.

In the second embodiment, operation of the plane data generation unit 122 as illustrated in steps S36 to S38 of FIG. 15 in the first embodiment explained above (including operation illustrated in FIGS. 17 to 19) may be executed within the DFE 50. This operation may be, for example, executed by the rendering engine 51. In this case, for example, the print data generation unit 123 executed by the control unit 15 of the host apparatus 10 (see FIG. 6) may describe, in the user definition region of the print data as illustrated in FIG. 13, the coordinates and the shape of the plus designation area in the image data of the gloss control plane and information indicating the surface effect of the plus designation given thereto. Examples of other methods include causing the host apparatus 10 to transmit, to the DFE 50, the coordinates of the plus designation area of the image data of the gloss control plane and information indicating the type of surface effect thereof (including the plus designation), which are transmitted separately from the print data (see FIG. 13).

Like the first embodiment, the above configuration and operation also allows the surface effect of one of the regions to be made in an emphasized manner in appearance as compared with the surface effect of the other of the regions even when the same type of surface effect is designated for an adjacent region. It should be noted that the other configuration and operation may be the same as those of the first embodiment, and therefore, detailed description thereabout is omitted.

Third Embodiment

In the first to second embodiments, the host apparatus 10 is provided with the plane data generation unit 122 and the print data generation unit 123, and the DFE 50 is provided with the clear processing 56, and the host apparatus 10 is configured to perform plane data generation processing to generate color plane data, clear plane data, and gloss control plane data, and generation processing of print data, and the DFE 50 is configured to perform generation processing of the clear toner plane data, but the embodiment is not limited thereto.

More specifically, any one of multiple pieces of processing performed by a certain apparatus may be configured to be performed by one or more other apparatuses connected via a network with the certain apparatus.

For example, in an image forming system according to the third embodiment, some of the functions of the host apparatus and the DFE are implemented on a server apparatus on a network.

Figure 27:
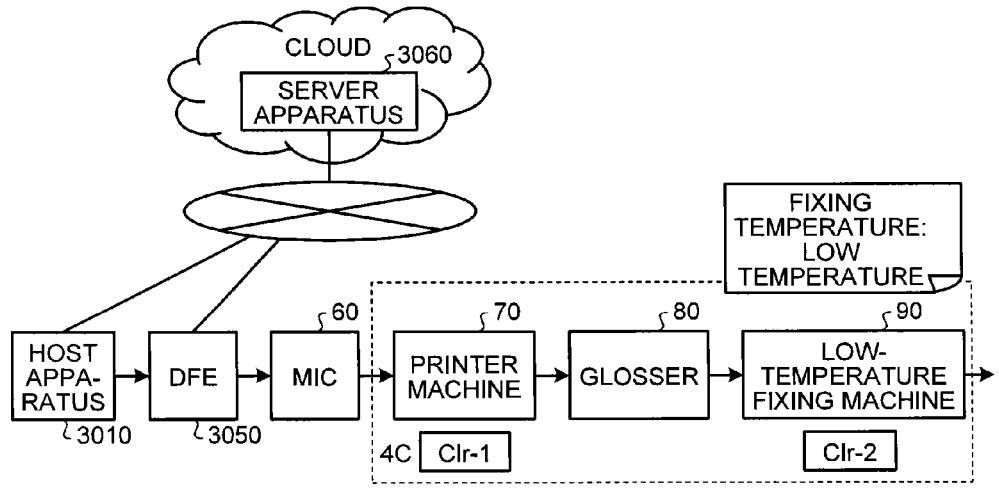
FIG. 27 is a figure illustrating an example of configuration of an image forming system according to a third embodiment.

FIG. 27 is a figure illustrating an example of configuration of the image forming system according to the third embodiment. As illustrated in FIG. 27, the image forming system of the present embodiment includes a host apparatus 3010, a DFE 3050, an MIC 60, a printer machine 70, a glosser 80, a low-temperature fixing machine 90, and a server apparatus 3060 on the cloud. Post-processing apparatuses such as the glosser 80 and the low-temperature fixing machine 90 are not limited thereto.

In the present embodiment, the host apparatus 3010 and the DFE 3050 are configured to be connected via a network such as the Internet with the server apparatus 3060. In the present embodiment, the plane data generation unit 122 and the print data generation unit 123 of the host apparatus 10 according to the first embodiment and the clear processing 56 of the DFE 50 of the first embodiment are provided in the server apparatus 3060.

In this case, the configuration of connection of the host apparatus 3010, the DFE 3050, the MIC 60, the printer machine 70, the glosser 80, and the low-temperature fixing machine 90 is the same as that of the first embodiment.

More specifically, in the third embodiment, the host apparatus 3010 and the DFE 3050 are connected via a network (cloud) such as the Internet with the single server apparatus 3060. The server apparatus 3060 is provided with a plane data generation unit 3062, a print data generation unit 3063, and a clear processing 3066, and the server apparatus 3060 is configured to perform plane data generation processing to generate color plane data, clear plane data and gloss control plane data, generation processing of print data, and generation processing of clear toner plane data.

Figure 28:
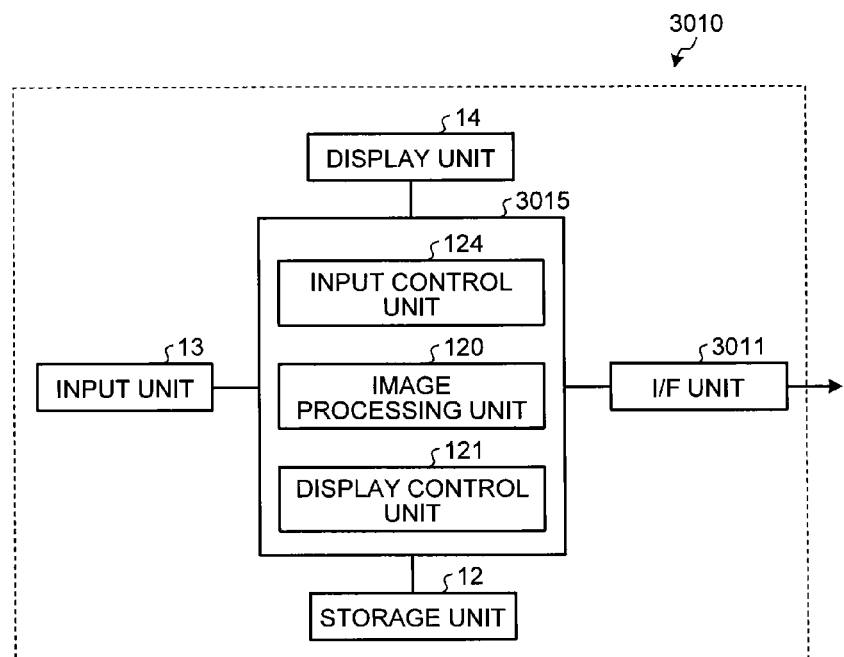
FIG. 28 is a block diagram illustrating a functional configuration of a host apparatus according to the third embodiment.

First, the host apparatus 3010 of the present embodiment will be explained. FIG. 28 is a block diagram illustrating a functional configuration of the host apparatus 3010 according to the third embodiment. As illustrated in FIG. 28, the host apparatus 3010 of the present embodiment includes an I/F unit 3011, a storage unit 12, an input unit 13, a display unit 14, and a control unit 3015. The I/F unit 3011 is an interface device for communication between the server apparatus 3060 and the DFE 50. The storage unit 12, the input unit 13, and the display unit 14 have the same functions and configurations as those of the host apparatus 10 according to the first embodiment.

The control unit 3015 controls the entire host apparatus 3010, and is a computer configured to include, e.g., a CPU, a ROM and a RAM. As illustrated in FIG. 28, the control unit 3015 mainly includes an input control unit 124, an image processing unit 120, and a display control unit 121. Among the above units, the input control unit 124 and the display control unit 121 are achieved by causing the CPU of the control unit 3015 to read a program of operating system stored in the ROM and the like and extract and execute the program on the RAM. The image processing unit 120 is achieved by causing the CPU of the control unit 3015 to read the program of the image processing application explained above stored in the ROM and the like and extract and execute the program on the RAM. At least some of these units may be achieved with individual circuits (hardware). The input control unit 124, the display control unit 121, and the image processing unit 120 have the same functions and configurations as those of the first embodiment.

Like first embodiment, the host apparatus 3010 of the present embodiment is configured such that the user operates the input unit 13 while the user confirms image designation information to designate one of various kinds of image stored in the storage unit 12 to which surface effect is to be given (for example, picture, character, figure, an image obtained by compositing them), i.e., the image data of the color plane (target image) and the target image displayed on the display unit 14, so that the input control unit 124 receives designation information including designation of the region where surface effect is given and the type of surface effect and designation of a transparent image such as watermark and texture and of a region where the transparent image is given. The server apparatus 3060 generates the image data of the gloss control plane on the basis of the designation of the region where surface effect is given and the type of the surface effect in the designation information. The server apparatus 3060 generates the image data of the clear plane on the basis of designation of a transparent image such as watermark and texture and of a region where the transparent image is given in the designation information. It should be noted that generation of the image data in each plane will be explained later.

Hereinafter, in the designation information, the designation of the region where surface effect is given and the type of surface effect may be simply referred to as "designation of surface effect". In the designation information, designation of a transparent image such as watermark and texture and a region where the transparent image is given may be simply referred to as "designation of transparent image".

The I/F unit 3011 transmits the image designation information and the designation information as well as generation request of print data to the server apparatus 3060. In response to the generation request, the I/F unit 3011 receives the print data generated by the server apparatus 3060 from the server apparatus 3060. In this case, the image data of the gloss control plane, the image data of the color plane, and the image data of the clear plane are the same as the image data of the first embodiment. The print data are obtained by uniting the image data of the color plane, the image data of the gloss control plane, the image data of the clear plane, and job commands, and are the same as the print data of the first embodiment illustrated in FIG. 13.

Figure 29:
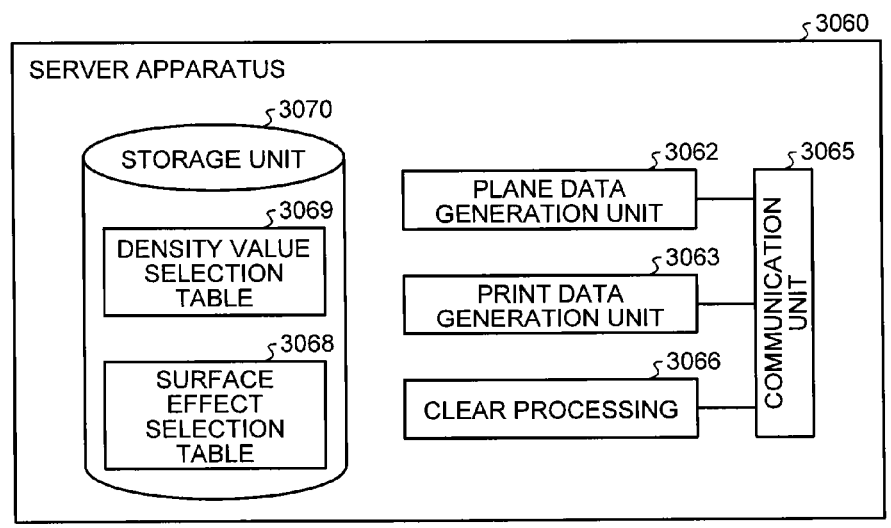
FIG. 29 is a block diagram illustrating a functional configuration of a server apparatus according to the third embodiment.

Subsequently, the server apparatus 3060 will be explained. FIG. 29 is a block diagram illustrating a functional configuration of the server apparatus 3060 according to the third embodiment. As illustrated in FIG. 29, the server apparatus 3060 mainly includes a storage unit 3070, a plane data generation unit 3062, a print data generation unit 3063, a clear processing 3066, and a communication unit 3065.

The storage unit 3070 is a storage medium such as an HDD and a memory, and stores a density value selection table 3069 and a surface effect selection table 3068. The density value selection table 3069 is the same as the density value selection table of the first embodiment explained with reference to FIG. 12. The surface effect selection table 3068 is the same as the surface effect selection table of the first embodiment explained with reference to FIG. 22.

The communication unit 3065 transmits and receives various kinds of data and requests with the host apparatus 3010 and the DFE 3050. More specifically, the communication unit 3065 receives the image designation information, the designation information, and generation request of print data from the host apparatus 3010, and transmits the generated print data to the host apparatus 3010. The communication unit 3065 receives the eight-bit image data of the gloss control plane, the eight-bit image data of the color plane, and generation request of clear toner plane from the DFE 3050, and transmits the generated image data of the clear toner plane and ON/OFF information to the DFE 3050.

The plane data generation unit 3062 has the same function as the plane data generation unit 122 of the host apparatus 10 according to the first embodiment, and generates the image data of the color plane, the image data of the gloss control plane, and the image data of the clear plane.

More specifically, the plane data generation unit 3062 generates the image data of the color plane on the basis of the image designation information. More specifically, when the image designation information includes color designation given by the user for the drawing object of the target image, the plane data generation unit 3062 generates the image data of the color plane in accordance with the color designation.

When the designation information includes designation of a transparent image such as watermark and texture other than the surface effect and of a region to which the transparent image is given, the plane data generation unit 3062 generates the image data of the clear plane to identify the transparent image and the region of the sheet where the transparent image is given in accordance with the designation information given by the user.

The plane data generation unit 3062 looks up the density value selection table 3069, and generates the image data of the gloss control plane capable of identifying the region of the sheet where the surface effect is given and the type of surface effect on the basis of the designation of the region where surface effect is given and the type of surface effect in the designation information. In this case, the plane data generation unit 3062 generates the image data of the gloss control plane (see FIGS. 4 and 16) in which the region where the surface effect is given indicated by the gloss control value is designated in units of drawing objects of the image data of the target image.

The print data generation unit 3063 of the present embodiment generates the print data as illustrated in FIG. 13 like the print data generation unit 123 of the host apparatus 10 according to the first embodiment.

The clear processing 3066 has the same function as the clear processing 56 in the DFE 50 of the first embodiment. More specifically, the clear processing 3066 uses the image data of the gloss control plane received by the communication unit 3065 from the DFE 3050 to look up the surface effect selection table 3068, determines the surface effect for the density value (pixel value) represented by each pixel constituting the gloss control plane, and determines the ON/OFF state of the glosser 80 in accordance with the determination as well as generates the inverse mask and the solid mask as necessary using the received eight-bit image data of each of CMYK, whereby the two-bit image data of the clear toner plane to attach the clear toner are generated as necessary. Then, in accordance with the result of determination of the surface effect, the clear processing 3066 generates and outputs, as necessary, the image data of the clear toner plane used by the printer machine 70 and the image data of the clear toner plane used by the low-temperature fixing machine 90, and further outputs the image data, and generates ON/OFF information indicating the ON/OFF state of the glosser 80.

Figure 30:
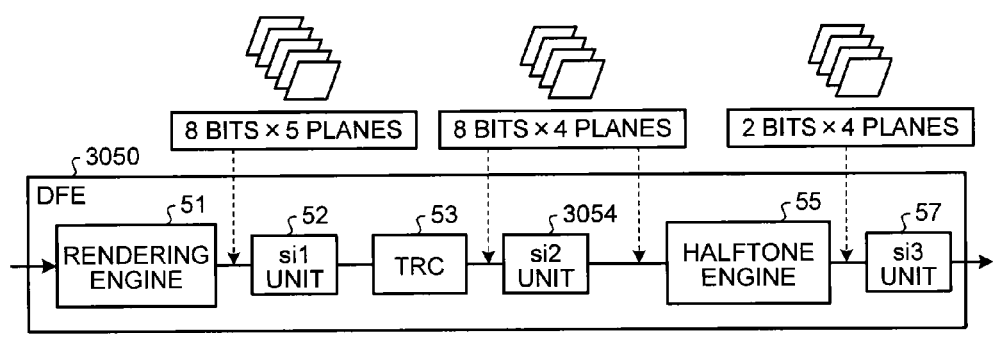
FIG. 30 is a block diagram illustrating a functional configuration of DFE according to the third embodiment.

Subsequently, the DFE 3050 will be explained. FIG. 30 is a block diagram illustrating a functional configuration of the DFE 3050 according to the third embodiment. The DFE 3050 of the present embodiment mainly includes a rendering engine 51, an si1 unit 52, a TRC 53, an sit unit 3054, a halftone engine 55, and an si3 unit 57. In this case, the rendering engine 51, the si1 unit 52, the TRC 53, the halftone engine 55, and the si3 unit 57 have the same functions and configurations as those in the DFE 50 of the first embodiment.

The si2 unit 3054 of the present embodiment transmits the eight-bit image data of the gloss control plane having been subjected to the gamma correction by the TRC 53, the eight-bit image data of the CMYK color planes, and generation request of the clear toner plane to the server apparatus 3060, and receives the image data of the clear toner plane and the ON/OFF information from the server apparatus 3060.

Figure 31:
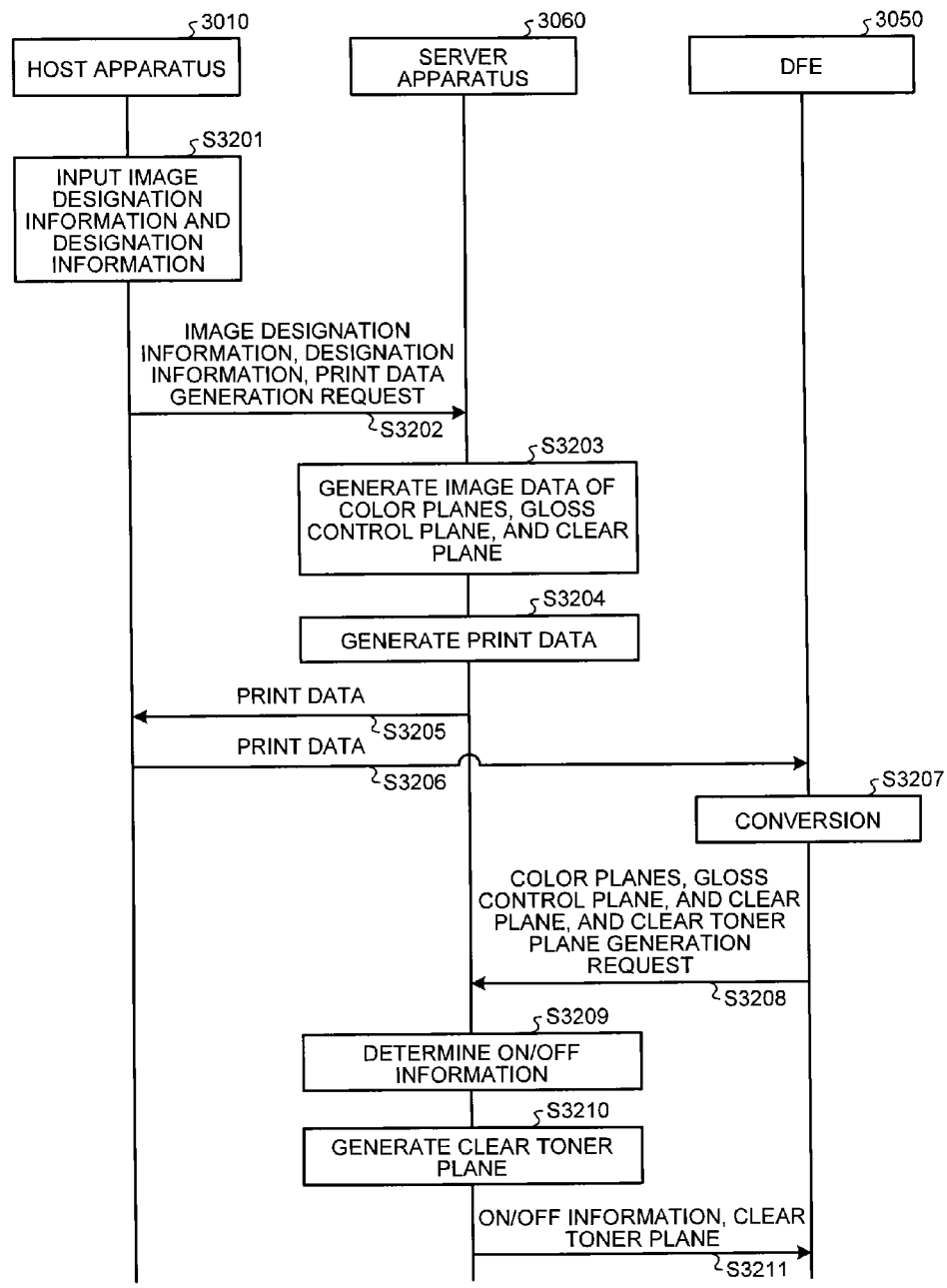
FIG. 31 is a sequence diagram illustrating overall flow of generation processing of clear toner plane according to the third embodiment.

Subsequently, generation processing of the clear toner plane required for print processing by the image forming system according to the present embodiment configured as described above will be explained. First, the overall flow of the generation processing of the clear toner plane will be explained. FIG. 31 is a sequence diagram illustrating overall flow of generation processing of the clear toner plane according to the third embodiment.

First, the host apparatus 3010 receives image designation information and designation information from the user (step S3201), and transmits the image designation information and the designation information as well as print data generation request to the server apparatus 3060 (step S3202).

The server apparatus 3060 receives the image designation information and the designation information as well as the print data generation request, and generates each of the image data of the color plane, the image data of the gloss control plane, and the image data of the clear plane (step S3203). Then, server apparatus 3060 generates print data from the image data (step S3204), and transmits the generated print data to the host apparatus 3010 (step S3205).

When the host apparatus 3010 receives the print data, the host apparatus 3010 transmits the print data to the DFE 3050 (step S3206).

When the DFE 3050 receives the print data from the host apparatus 3010, the DFE 3050 analyzes the print data, obtains the image data of the color plane, the image data of the gloss control plane, and the image data of the clear plane, and performs conversion, correction, and the like on the image data (step S3207). Then, the DFE 3050 transmits the image data of the color plane, the image data of the gloss control plane, the image data of the clear plane, and the clear toner plane generation request to the server apparatus 3060 (step S3208).

When the server apparatus 3060 receives the image data of the color plane, the image data of the gloss control plane, the image data of the clear plane, and the clear toner plane generation request, the server apparatus 3060 determines ON/OFF information (step S3209), and generates the image data of the clear toner plane (step S3210). Then, the server apparatus 3060 transmits the determined ON/OFF information and the generated image data of the clear toner plane to the DFE 3050 (step S3211).

Figure 32:
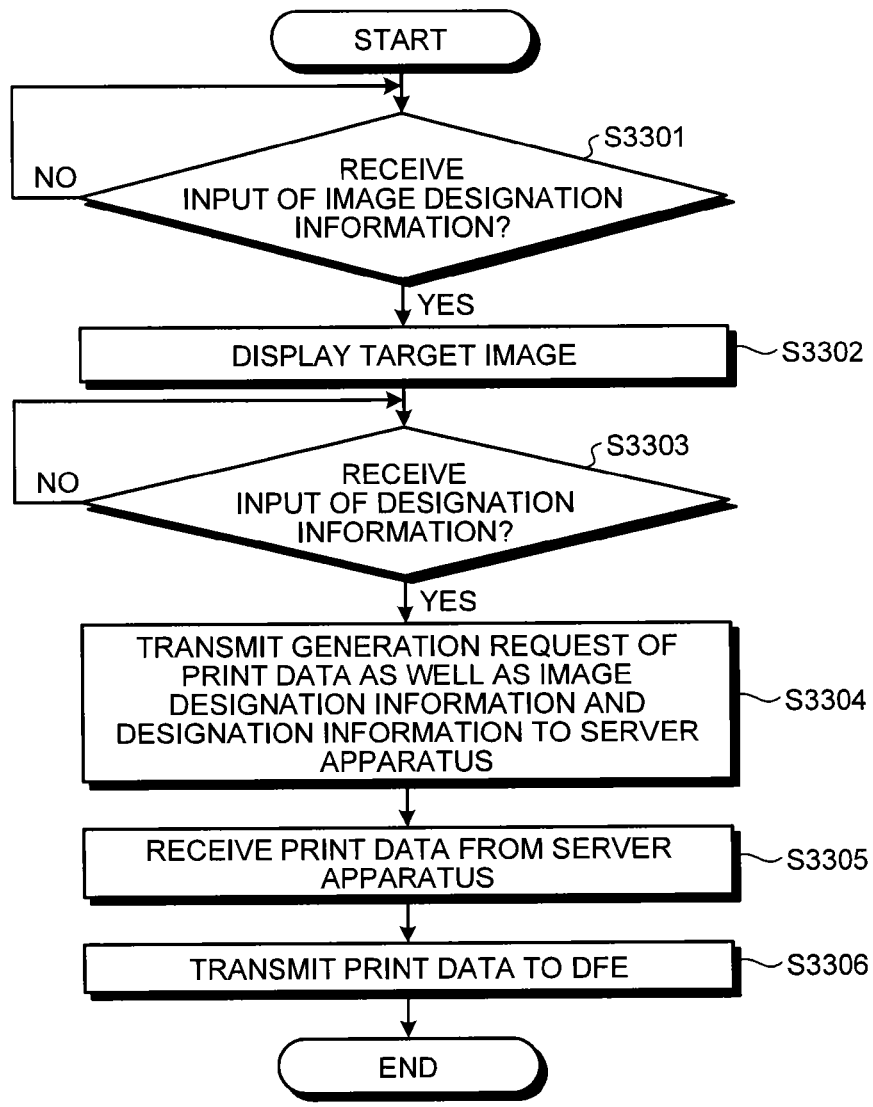
FIG. 32 is a flowchart illustrating procedure of processing performed with a host apparatus according to the third embodiment.

Hereinafter, the details of each processing achieved by cooperation of the host apparatus 3010, the server apparatus 3060, and the DFE 3050 in the above overall flow will be explained. First, generation processing of the gloss control plane and the print data by the host apparatus 3010 and the server apparatus 3060 will be explained. FIG. 32 is a flowchart illustrating procedure of processing performed with the host apparatus 3010 according to the third embodiment.

First, when the input control unit 124 receives input of image designation information (step S3301; Yes), the display control unit 121 controls the display unit 14 to display the image designated by the received image designation information (step S3302). Subsequently, when the input control unit 124 receives input of designation information of the surface effect and the transparent image (step S3303; Yes), the I/F unit 3011 transmits, to the server apparatus 3060, the generation request of the print data as well as the image designation information and the designation information thus received (step S3304).

Then, when the print data are generated by the server apparatus 3060, the I/F unit 3011 receives the data (step S3305). Then, the I/F unit 3011 transmits the print data to the DFE 3050 (step S3306).

Figure 33:
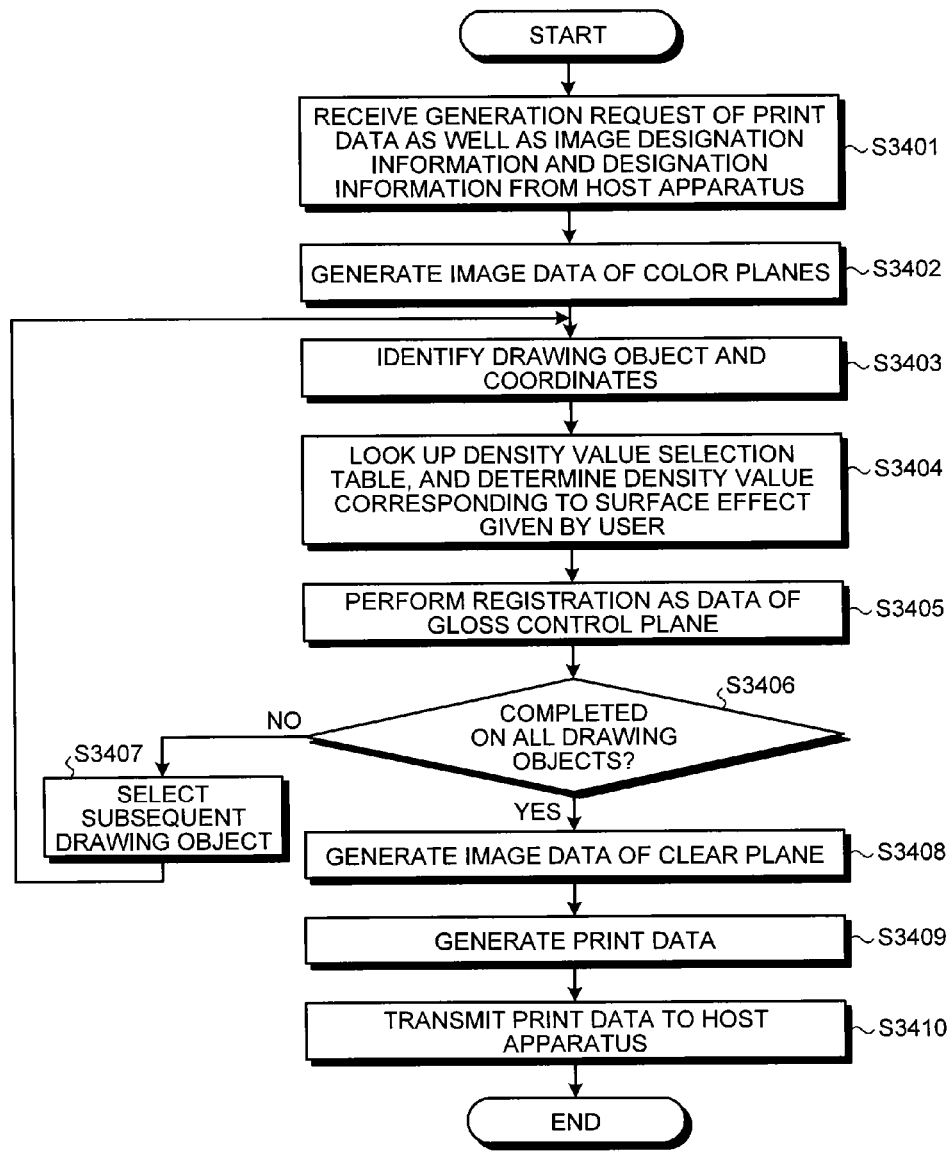
FIG. 33 is a flowchart illustrating procedure of generation processing of print data and image data of gloss control plane performed with a server apparatus according to the third embodiment.

FIG. 33 is a flowchart illustrating procedure of generation processing of print data and image data of gloss control plane performed with the server apparatus 3060 according to the third embodiment. When the communication unit 3065 receives the generation request of the print data, the image designation information, and the designation information from the host apparatus 3010 (step S3401), first, the plane data generation unit 3062 generates the image data of the color plane on the basis of the image designation information (step S3402).

Subsequently, the plane data generation unit 3062 uses a drawing command provided by an operating system and the like and coordinate values and the like set by the drawing command to identify the drawing object for which the surface effect is given with regard to the target image and the coordinates thereof in accordance with the designation information (step S3403).

Subsequently, the plane data generation unit 3062 looks up the density value selection table 3069 saved in the storage unit 3070 to determine the density value serving as the gloss control value corresponding to the surface effect given by the user as the designation information (step S3404).

Then, the plane data generation unit 3062 registers the drawing object and the density value determined in accordance with the surface effect in a manner associated with each other, as the image data of the gloss control plane (which are originally vacant data) (step S3405).

Subsequently, the plane data generation unit 3062 determines whether the processing from steps S3402 to S3404 explained above have been completed or not with regard to all the drawing objects existing in the target image (step S3406). Then, when not completed (step S3406; No), the plane data generation unit 3062 selects a subsequent drawing object that is not yet processed in the target image (step S3407), and repeatedly executes the processing from steps S3403 to S3405.

Then, in step S3406, when the processing from steps S3403 to S3405 are determined to have been completed with regard to all the drawing objects in the target image (step S3406; Yes), generation of the image data of the gloss control plane is completed, and the image data of the gloss control plane as illustrated in FIGS. 4 and 13 are obtained.

Subsequently, the plane data generation unit 3062 generates the image data of the clear plane on the basis of designation of the transparent image in the designation information (step S3408).

Then, the print data generation unit 3063 generates original document data obtained by uniting the image data of the color plane, the image data of the gloss control plane, and the image data of the clear plane, adds a job command to the united original document data, and generates print data in the PDF format as illustrated in FIG. 13 (step S3409). Then, the communication unit 3065 transmits the generated print data to the host apparatus 3010 (step S3410).

Figure 34:
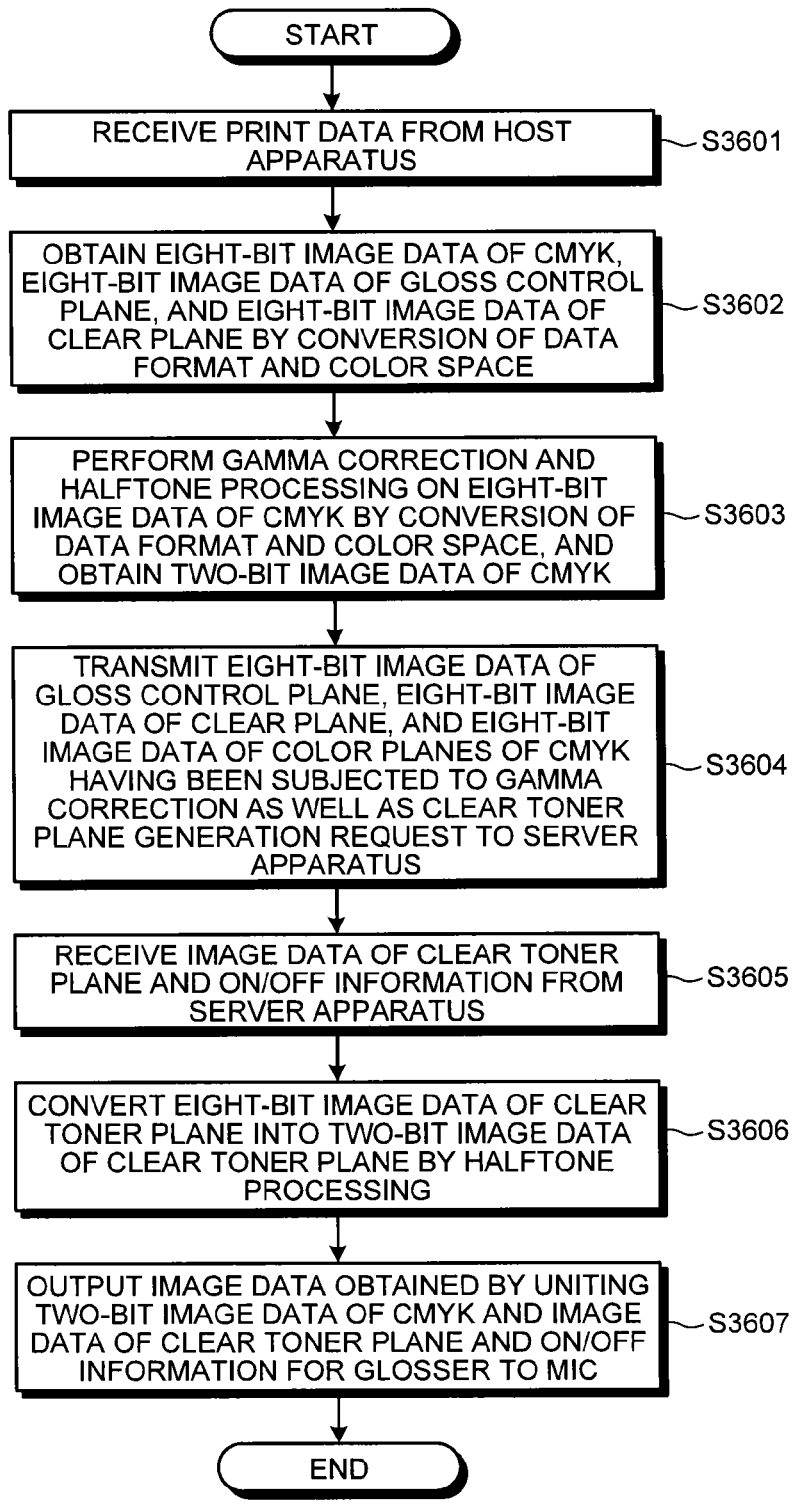
FIG. 34 is a flowchart illustrating procedure of processing of DFE according to the third embodiment.

Subsequently, generation processing of the image data of the clear toner plane by the DFE 3050 and the server apparatus 3060 will be explained. FIG. 34 is a flowchart illustrating procedure of processing of the DFE 3050.

When the DFE 3050 receives print data from the host apparatus 3010 (step S3601), the rendering engine 51 interprets the image data as language, converts the image data of the gloss control plane expressed in a vector format into a raster format, and converts the color space expressed in an RGB format into a color space of CMYK format, whereby eight-bit image data of each of CMYK color planes and eight-bit gloss control plane, the eight-bit image data of the gloss control plane, and the eight-bit image data of the clear plane are obtained (step S3602).

The details of the conversion processing of the image data of the gloss control plane in step S3602 are the same as the conversion processing of the image data of the gloss control plane of the first embodiment explained with reference to FIG. 25. With such conversion processing, the image data of the gloss control plane are converted into data in which the surface effect is set for each pixel.

When the eight-bit image data of the gloss control plane are output, the TRC 53 of the DFE 3050 performs gamma correction with a gamma curve of 1D_LUT generated by calibration on the eight-bit image data of each of CMYK color planes, and the halftone engine 55 performs the halftone processing on the image data having been subjected to the gamma correction to convert the image data into a data format of two-bit image data of each of CMYK for output to the printer machine 70, and thus, the two-bit image data of each of CMYK having been subjected to the halftone processing are obtained (step S3603).

Then, the si2 unit 3054 transmits the eight-bit image data of the gloss control plane, the eight-bit image data of each of the CMYK color planes having been subjected to the gamma correction, and the eight-bit image data of the clear plane as well as generation request of the clear toner plane to the server apparatus 3060 (step S3604).

Figure 35:
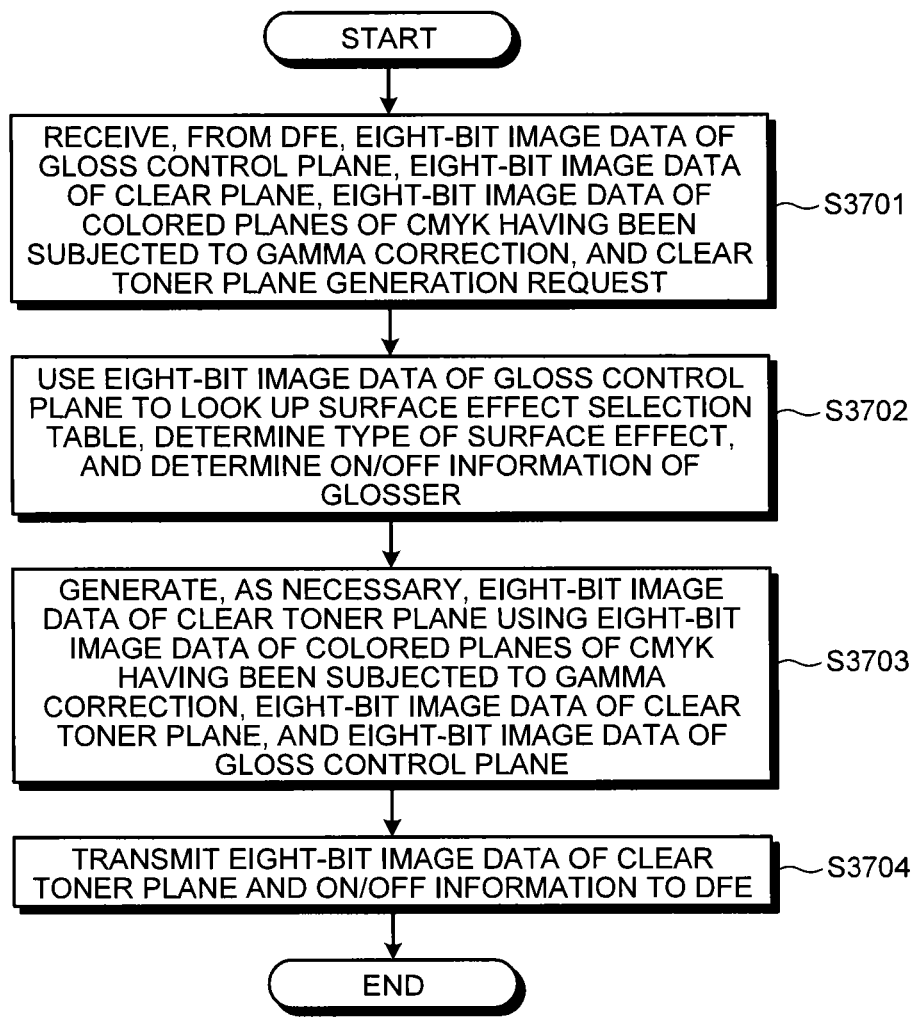
FIG. 35 is a flowchart illustrating procedure of generation processing of clear toner plane with the server apparatus according to the third embodiment.

Hereinafter, generation processing of the clear toner plane by the server apparatus 3060 will be explained. FIG. 35 is a flowchart illustrating procedure of generation processing of clear toner plane with the server apparatus 3060 according to the third embodiment.

In the server apparatus 3060, the communication unit 3065 receives, from the DFE 3050, the eight-bit image data of the gloss control plane, the eight-bit image data of each of the CMYK color planes having been subjected to the gamma correction, the eight-bit image data of the clear plane, and the generation request of the clear toner plane (step S3701).

Then, the clear processing 3066 uses the eight-bit image data of the gloss control plane to look up the surface effect selection table 3068 of the storage unit 3070, and determines the surface effect designated for each pixel value as indicated by the image data of the gloss control plane. Then, the clear processing 3066 makes determination with regard to all the pixels constituting the image data of the gloss control plane. In the image data of the gloss control plane, all the pixels constituting each of the regions where surface effect is given are basically represented by density values in the same range. Accordingly, the clear processing 3066 determines that pixels in proximity that are determined to be the same surface effect are included in the region where the same surface effect is given. As described above, the clear processing 3066 determines the region where surface effect is given and the type of surface effect given to the region, and determines the ON/OFF state of the glosser 80 in accordance with the determination (step S3702).

Subsequently, the clear processing 3066 uses, as necessary, the eight-bit image data of each of CMYK having been subjected to the gamma correction, the eight-bit image data of the gloss control plane, and the eight-bit image data of the clear plane to generate, as necessary, the eight-bit image data of the clear toner plane to attach the clear toner (step S3703). As a result, the server apparatus 3060 generates the eight-bit image data of the clear toner plane and the ON/OFF information.

Then, the communication unit 3065 transmits the eight-bit image data of the clear toner plane generated by the clear processing 3066 and the ON/OFF information to the DFE 3050 (step S3704).

Back to FIG. 34, after the DFE 3050 transmits the generation request of the clear toner plane to the server apparatus 3060, the si2 unit 3054 receives the eight-bit image data of the clear toner plane and the ON/OFF information from the server apparatus 3060 (step S3605).

Then, the halftone engine 56 converts, by the halftone processing, the eight-bit image data of the clear toner plane using the eight-bit image data into the two-bit image data of the clear toner plane (step S3606).

Subsequently, the Si3 unit 57 of the DFE 305 unites the two-bit image data of each of CMYK having been subjected to the halftone processing obtained in step S3603 and the two-bit image data of the clear toner plane generated in step S3606, and outputs the united image data and the ON/OFF information indicating the ON/OFF state of the glosser 80 received in step S3605 to the MIC 60 (step S3607).

When the server apparatus 3060 does not generate the image data of the clear toner plane, only the two-bit image data of each of CMYK having been subjected to the halftone processing obtained in step S3603 are united and output to the MIC 60 in step S3607.

Subsequent processing of the MIC 60, the printer machine 70, the glosser 80, and the low-temperature fixing machine 90 are performed in the same manner as the processing of the first embodiment.

As described above, in the present embodiment, the image data of the color plane, the image data of the gloss control plane, the image data of the clear plane, print data, and the image data of the clear toner plane are generated by the server apparatus 3060 on the cloud, and therefore, not only the effects of the first embodiment are obtained, but also even when there are multiple host apparatuses 3010 and DFEs 3050, for example, the density value selection table and the surface effect selection table can be changed at a time, which is convenient for the administrator.

In the present embodiment, the single server apparatus 3060 on the cloud is provided with the plane data generation unit 3062, the print data generation unit 3063, and the clear processing 3066, and the server apparatus 3060 is configured to perform plane data generation processing to generate color plane data, clear plane data, and gloss control plane data, generation processing of print data, and generation processing of clear toner plane data, but the embodiment is not limited thereto.

Figure 36:
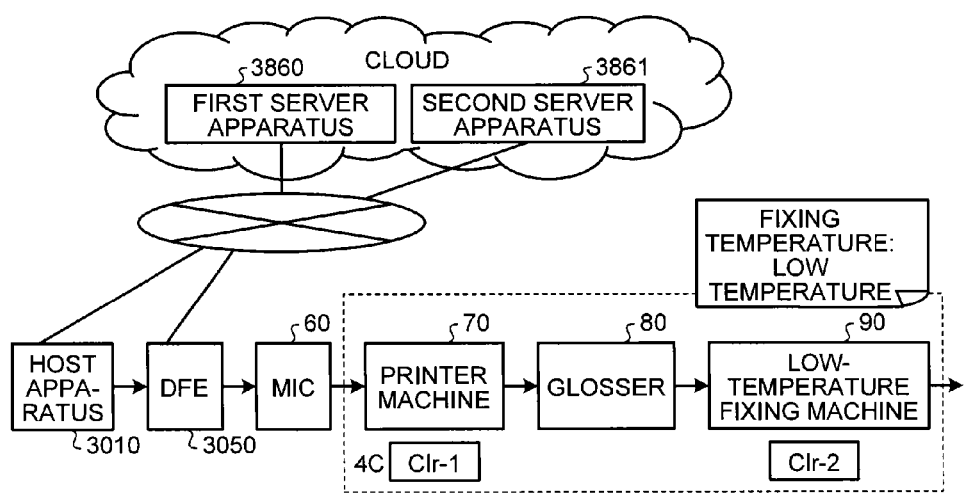
FIG. 36 is a network configuration diagram in which two servers are provided on the cloud.

For example, two or more server apparatuses may be provided on the cloud, and each of the above processing may be executed in a distributed manner by the two or more server apparatuses. FIG. 36 is a network configuration diagram in which two servers (a first server apparatus 3860 and a second server apparatus 3861) are provided on the cloud. In the example of FIG. 36, plane data generation processing to generate color plane data, clear plane data and gloss control plane data, generation processing of print data, and generation processing of clear toner plane data are configured to be executed in a distributed manner by the first server apparatus 3860 and the second server apparatus 3861.

For example, the first server apparatus 3860 may be provided with a plane data generation unit 3062 and a print data generation unit 3063, so that the first server apparatus 3860 may be configured to execute the plane data generation processing and the print data generation processing, and the second server apparatus 3861 may be provided with a clear processing 3066, so that the second server apparatus 3861 may be configured to execute the clear toner plane data generation processing. The form of distribution of each processing to each server apparatus is not limited thereto, and any given distribution can be adopted.

More specifically, as long as the host apparatus 3010 is provided with minimum configuration, e.g., the input unit 13, the input control unit 124, the image processing unit 120, the display control unit 121, and the display unit 14, any configuration can be adopted, e.g., some or all of the plane data generation unit 3062, the print data generation unit 3063, the clear processing 3066 may be provided on one server apparatus on the cloud in a concentrated manner, or may be provided in a distributed manner in multiple server apparatuses.

In other words, like the above example, any one of multiple pieces of processing performed by a certain apparatus may be configured to be performed by one or more other apparatuses connected via a network with the certain apparatus.

When processing is "performed by one or more other apparatuses connected via a network with the certain apparatus", the configuration includes the following case: data input/output processing performed between the certain apparatus and the other apparatus and further between the other apparatuses such as processing to output data (information) generated from processing performed by the certain apparatus from the certain apparatus to the other apparatus and processing to cause the other apparatus to input the data.

More specifically, there is only one other apparatus, this configuration includes data input/output processing performed between the certain apparatus and the other apparatus, and there are two or more apparatuses, the configuration includes data input/output processing between the certain apparatus and the other apparatus and between the other apparatuses, e.g., between the first of the other apparatuses and the second of the other apparatuses.

In the third embodiment, the server apparatus 3060 or multiple server apparatuses such as the first server apparatus 3860 and the second server apparatus 3861 are provided on the cloud, but the embodiment is not limited thereto. For example, the server apparatus 3060 or multiple server apparatuses such as the first server apparatus 3860 and the second server apparatus 3861 may be provided on any network, e.g., provided on an intranet.

Figure 37:
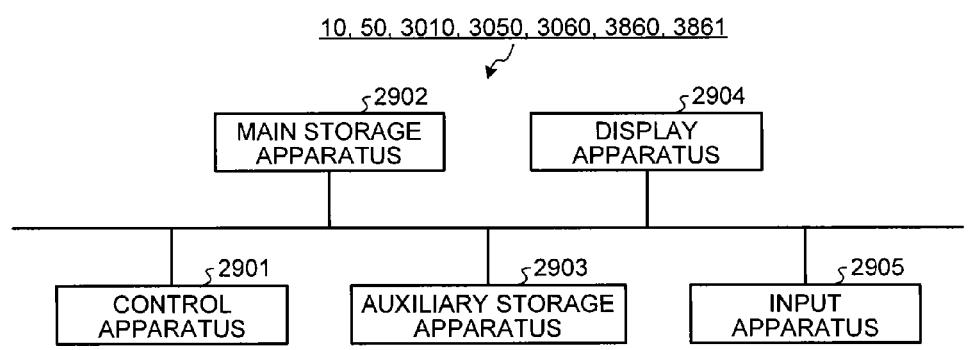
FIG. 37 is a hardware configuration diagram of a host apparatus, a DFE, and a server apparatus.

Hardware configuration of the host apparatus 10, 3010, the DFE 50, 3050, the server apparatus 3060, the first server apparatus 3860, and the second server apparatus 3861 according to the above embodiments will be explained. FIG. 37 is a hardware configuration diagram of the host apparatus 10, 3010, the DFE 50, 3050, and the server apparatus 3060. In hardware configuration, the host apparatus 10, 3010, the DFE 50, 3050, the server apparatus 3060, the first server apparatus 3860, and the second server apparatus 3861 mainly include a control apparatus 2901 such as a CPU to control the entire apparatus, a main storage apparatus 2902 such as a ROM and a RAM to store various kinds of data and various kinds of programs, an auxiliary storage apparatus 2903 such as an HDD to store various kinds of data and various kinds of programs, an input apparatus 2905 such as a keyboard and a mouse, and a display apparatus 2904 such as a display apparatus, and have hardware configuration using an ordinary computer.

The image processing program (including image processing application, the same is applied hereinafter) executed by the host apparatus 10, 3010 of the above embodiments is provided as a computer program product recorded as a file in an installable format or in an executable format to a computer-readable recording medium such as a CD-ROM, a flexible disk (FD), a CD-R, a DVD (Digital Versatile Disk), and the like.

The image processing program executed by the host apparatus 10, 3010 in the above embodiments may be configured to be provided in such a manner that each program is stored to a computer connected to a network such as the Internet to allow download via the network. The image processing program executed by the host apparatus 10 or 3010 in the above embodiments may be configured to be provided or distributed via a network such as the Internet.

The image processing program executed by the host apparatus 10 or 3010 in the above embodiments may be configured to be provided as being incorporated into a ROM and the like in advance.

The image processing program executed by the host apparatus 10 or 3010 in the above embodiments has a module configuration including each of the above units (the image processing unit, the plane data generation unit, the print data generation unit, the input control unit, and the display control unit). As actual hardware, the CPU (processor) reads and executes the image processing program from the storage medium, so that each unit is loaded to a main storage device, whereby the image processing unit, the plane data generation unit, the print data generation unit, the input control unit, and the display control unit are generated on the main storage apparatus.

The print control processing executed by the DFE 50, 3050 in the above embodiments may be not only be achieved as hardware but also achieved with the print control program as software. In this case, the print control program executed by the DFE 50, 3050 in the above embodiments are incorporated into the ROM and the like in advance and provided.

The print control program executed by the DFE 50, 3050 in the above embodiments may be configured to be provided as a computer program product recorded as a file in an installable format or in an executable format to a computer-readable recording medium such as a CD-ROM, a flexible disk (FD), a CD-R, a DVD (Digital Versatile Disk), and the like.

Further, the print control program executed by the DFE 50, 3050 in the above embodiments may be configured to be provided in such a manner that each program is stored to a computer connected to a network such as the Internet to allow download via the network. The print control program executed by the DFE 50, 3050 in the above embodiments may be configured to be provided or distributed via a network such as the Internet.

The print control program executed by the DFE 50, 3050 in the above embodiments has a module configuration including each of the above units (the rendering engine, the halftone engine, the TRC, the si1 unit, the si2 unit, the si3 unit, the clear processing). As actual hardware, the CPU (processor) reads and executes the print control program from the ROM, so that each unit is loaded to a main storage device, whereby the rendering engine, the halftone engine, the TRC, the si1 unit, the si2 unit, the si3 unit, and the clear processing are generated on the main storage apparatus.

The data generation processing executed by the server apparatus 3060 in the above embodiments may be not only be achieved as hardware but also achieved with the generation program as software. In this case, the generation programs executed by the server apparatus 3060 in the above embodiments are incorporated into the ROM and the like in advance and provided.

The data generation processing programs executed by the server apparatus 3060 in the above embodiments may be configured to be provided as a computer program product recorded as a file in an installable format or in an executable format to a computer-readable recording medium such as a CD-ROM, a flexible disk (FD), a CD-R, a DVD (Digital Versatile Disk), and the like.

Further, the data generation processing programs executed by the server apparatus 3060 in the above embodiments may be configured to be provided in such a manner that each program is stored to a computer connected to a network such as the Internet to allow download via the network. The data generation processing programs executed by the server apparatus 3060 in the above embodiments may be configured to be provided or distributed via a network such as the Internet.

The data generation processing programs executed by the server apparatus 3060 has a module configuration including each of the above units (the plane data generation unit, the print data generation unit, and the clear processing). As actual hardware, the CPU (processor) reads and executes the generation program from the ROM, so that each unit is loaded to a main storage device, whereby the plane data generation unit, the print data generation unit, and the clear processing are generated on the main storage apparatus.

In the above embodiments, the image forming system is configured to include the host apparatus 10, 3010, the DFE 50, 3050, the MIC 60, the printer machine 70, the glosser 80, and the low-temperature fixing machine 90, but the embodiment is not limited thereto. For example, the DFE 50, 3050, the MIC 60, and the printer machine 70 may be integrally formed, and may be configured as one image forming apparatus, or further, an image forming apparatus also including the glosser 80 and the low-temperature fixing machine 90 may be formed.

In the image forming systems of the above embodiments, images are formed using multiple CMYK color toners, but images may be formed using one color toner.

The printer system of the above embodiments is configured to include the MIC 60, but the embodiment is not limited thereto. The processing and the function of the MIC 60 explained above may be provided in another apparatus such as the DFE 50, and the configuration may not include the MIC 60.

The above embodiments and the modifications thereof are merely examples for carrying out the present invention, and the present invention is not limited thereto. Various modifications according to specifications and the like are within the scope of the present invention, and further, it would be clear that various other embodiments can be made from the above description within the scope of the present invention. For example, it is to be understood that the modifications illustrated as examples with regard to each embodiment as necessary may also be applied to other embodiments.

According to the embodiment, there is an advantage in that, even when the same type of surface effect is specified in adjacent or overlapping areas, the surface effect of one of the areas can be emphasized as compared with the surface effect of the other area.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus that generates print data to be printed onto a given recording medium, on the basis of image data of a gloss control plane including a type of a surface effect given to at least a region of the given recording medium and coordinates to identify the region which is given the surface effect, the information processing apparatus comprising:
    processing circuitry configured to
        generate the image data of the gloss control plane based on received control information, the received control information including (1) a first-region surface effect selected for a first region, (2) a second-region surface effect selected for a second region, and (3) a designation to emphasize the first region;
        change the selected second-region surface effect included in the received control information to a new value that is determined as a function of (1) the selected first-region surface effect, and (2) the selected second-region surface effect, when (1) the designation to emphasize the first region is received, and (2) the processing circuitry determines that the first region adjoins the second region;
        generate print data on the basis of the image data of the gloss control plane in which the second-region surface effect of the second region has been changed to the new value; and
        output the print data.

2. The information processing apparatus according to claim 1, wherein
    the type of the surface effect includes a first-glossiness surface effect to increase glossiness and a second-glossiness surface effect to decrease glossiness,
    when the first-glossiness surface effect is given to the first region, the processing circuitry changes the second-region surface effect given to the second region to a third-glossiness surface effect having glossiness lower than the first-glossiness surface effect, and
    when the second-glossiness surface effect is given to the first region, the processing circuitry changes the second-region surface effect given to the second region to a fourth-glossiness surface effect having glossiness higher than the second-glossiness surface effect.

3. A print control apparatus that generates image data to be printed onto a given recording medium, on the basis of image data of a gloss control plane including a type of a surface effect given to at least a region of the given recording medium and coordinates to identify the region which is given the surface effect, the print control apparatus comprising:
    processing circuitry configured to
        receive (1) a first-region surface effect selected for a first region, (2) a second-region surface effect selected for a second region, and (3) a designation to emphasize the first region;
        change the received second-region surface effect selected for the second region to a new value that is determined as a function of (1) the received first-region surface effect selected for the first region, and (2) the received second-region surface effect, when (1) the designation to emphasize the first region is received, and (2) the processing circuitry determines that the first region adjoins the second region;
        generate the print data to be printed onto the given recording medium on the basis of the image data of the gloss control plane in which the second-region surface effect of the second region has been changed to the new value; and
        outputs the print data.

4. An image forming system that generates image data to be printed onto a given recording medium, on the basis of image data of a gloss control plane including a type of a surface effect given to at least a region of the given recording medium and coordinates to identify the region which is given the surface effect, the image forming system comprising:
    processing circuitry configured to
        receive (1) a first-region surface effect selected for a first region, (2) a second-region surface effect selected for a second region, and (3) a designation to emphasize the first region;
        change the received second-region surface effect selected for the second region to a new value that is determined as a function of (1) the received first-region surface effect selected for the first region, and (2) the received second-region surface effect, when (1) the designation to emphasize the first region is received, and (2) the processing circuitry determines that the first region adjoins the second region;

generate the print data to be printed onto the given recording medium on the basis of the image data of the gloss control plane in which the second-region surface effect of the second region has been changed to the new value; and output the print data.

5. The information processing apparatus of claim 1, further comprising an input interface, wherein a user selects the first-region surface effect and the second-region surface effect via the input interface.

6. The information processing apparatus of claim 1, wherein the processing circuitry is further configured to change the selected second-region surface effect independently of a type of the given recording medium.

* * * * *